US012602359B2

(12) United States Patent
Breen et al.

(10) Patent No.: US 12,602,359 B2
(45) Date of Patent: Apr. 14, 2026

(54) SYSTEMS AND METHODS FOR DATA ENTITY MATCHING BETWEEN DISPARATE DATASETS

(71) Applicant: Optum Services (Ireland) Limited, Dublin (IE)

(72) Inventors: Conor Brian Breen, Dublin (IE); Conor Power, Dublin (IE); Fadong Yan, Basking Ridge, NJ (US); Kashyap Krishnamurthy, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 0 days.

(21) Appl. No.: 18/402,232

(22) Filed: Jan. 2, 2024

(65) Prior Publication Data

US 2025/0139067 A1      May 1, 2025

Related U.S. Application Data

(60) Provisional application No. 63/594,271, filed on Oct. 30, 2023.

(51) Int. Cl.
*G06F 16/20* (2019.01)
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
CPC ........................... G06F 16/215; G06F 16/2365
(Continued)

(56) References Cited

U.S. PATENT DOCUMENTS

| | | | | |
|---|---|---|---|---|
| 7,178,100 | B2 * | 2/2007 | Call | G06F 40/221 |
| | | | | 715/210 |
| 9,535,902 | B1 * | 1/2017 | Michalak | G06F 16/3331 |

(Continued)

FOREIGN PATENT DOCUMENTS

| | | | |
|---|---|---|---|
| WO | WO2023043729 | * | 3/2023 |
| WO | WO2023043729 A1 | * | 3/2023 |

OTHER PUBLICATIONS

Huseby, Kristin, "How to Improve the Performance of a Machine Learning Model with Post Processing Employing Levenshtein Distance", Towards Data Science, May 20, 2020, (10 pages), https://towardsdatascience.com/how-to-improve-the-performance-of-a-machine-learning-model-with-post-processing-employing-b8559d2d670a.

*Primary Examiner* — Daniel A Kuddus
(74) *Attorney, Agent, or Firm* — Alston & Bird LLP

(57) ABSTRACT
Embodiments of the present disclosure provide systems and methods for matching data entities across disparate datasets. One method may include generating a reference numeric vector for a reference data object and generating a plurality of match candidate numeric vectors for a plurality of match candidate data objects. The method may also include identifying a subset of match candidate data objects from the plurality of match candidate data objects and generating a plurality of data features based on a comparison between one or more reference object attributes corresponding to the reference data object and one or more matching object attributes corresponding to the subset of match candidate data objects. The method may also include identifying a match between the reference data object and a match candidate data object of the subset of match candidate data objects based on the plurality of data features.

20 Claims, 10 Drawing Sheets

300

(58) Field of Classification Search
USPC .......................... 707/692, 694, 728, 731, 748
See application file for complete search history.

(56) References Cited

U.S. PATENT DOCUMENTS

| | | | |
|---|---|---|---|
| 10,510,046 B2 | 12/2019 | Whittier et al. | |
| 11,494,441 B2 | 11/2022 | Mathew et al. | |
| 11,853,700 B1 * | 12/2023 | Funk | G06F 40/30 |
| 2003/0033347 A1 * | 2/2003 | Bolle | G06F 16/786 |
| | | | 707/E17.022 |
| 2007/0250497 A1 * | 10/2007 | Mansfield | G06F 16/36 |
| | | | 707/999.005 |
| 2010/0023511 A1 | 1/2010 | Borodziewicz et al. | |
| 2013/0124525 A1 * | 5/2013 | Anderson | G06F 16/278 |
| | | | 707/737 |
| 2016/0239492 A1 * | 8/2016 | Rocca | G06F 16/24578 |
| 2019/0311372 A1 | 10/2019 | Lindner | |
| 2021/0224602 A1 * | 7/2021 | Nori | G06F 18/2415 |
| 2022/0019914 A1 * | 1/2022 | James | G06F 16/2379 |
| 2022/0207429 A1 * | 6/2022 | Haribhakti | G06N 20/10 |
| 2022/0214579 A1 * | 7/2022 | Zhang | G02F 1/133608 |
| 2022/0327689 A1 * | 10/2022 | Gilbertson | G06T 7/11 |
| 2023/0119402 A1 * | 4/2023 | Kumar | G06N 3/09 |
| | | | 706/12 |
| 2023/0214579 A1 * | 7/2023 | Somech | G06N 3/0455 |
| | | | 715/271 |
| 2023/0316098 A1 * | 10/2023 | Sabapathy | G06N 20/20 |
| | | | 706/12 |
| 2023/0326098 A1 * | 10/2023 | Zweigle | G06T 7/60 |
| | | | 382/284 |

* cited by examiner

500

600

| First Name | Last Name | Date of Birth |
|---|---|---|
| victoria r | hensh | 20010502 |
| omar | hernandez | 20171010 |
| colleen | overstreet | 19970418 |

505-a
505-b
505-c

| First Name | Last Name | Date of Birth |
|---|---|---|
| victoria | hensh | 20010502 |
| omar | hernandez | 20171010 |
| colleen | overstreet | 19970417 |

315-a
315-b
315-c

Discrepency 605

FIG. 6

GENERATE REFERENCE NUMERIC VECTOR

1005

GENERATE MATCH CANDIDATE NUMERIC VECTORS

1010

IDENTIFY SUBSET OF MATCH CANDIDATE DATA OBJECTS

1015

GENERATE DATA FEATURES

1020

IDENTIFY MATCH

1025

1000

SYSTEMS AND METHODS FOR DATA ENTITY MATCHING BETWEEN DISPARATE DATASETS

CROSS-REFERENCE TO RELATED APPLICATIONS

This application claims the benefit of U.S. Provisional Application No. 63/594,271, entitled "Machine Learning Feature Generation Techniques for Entity Verification Across Disparate Datasets," and filed Oct. 30, 2023, the entire contents of which are herein incorporated by reference.

BACKGROUND

Various embodiments of the present disclosure address technical challenges related to the data management from multiple, disparate data sources. In a variety of data-intensive applications, data associated with a single entity, such as an individual, may be obtained from and stored by a variety of data sources. For example, in a clinical context, data for an individual may be collected and stored by a variety of different insurance providers for which the individual is a member. Due to data recordation errors, discrepancies may exist between data for a single data entity as stored by different sources. As one illustrative example, a first and second dataset, operated by different platforms, may store overlapping information for a single data entity, such as common entity name, correspondence information, and/or the like. Without errors, the single data entity may be matched across datasets based on an exact match between the overlapping data. However, exact matching is not possible in the event of errors, such as typographical errors causing a textual or numerical difference between data entity records, that cause discrepancies between the information stored for the single data entity by the different platforms. Such discrepancies give rise to various technical challenges related to data aggregation and, more specifically, data entity matching. Various embodiments of the present disclosure make important contributions to various existing data entity matching approaches by addressing these technical challenges.

BRIEF SUMMARY

Various embodiments of the present disclosure provide systems and methods for improving data integration and, more specifically, data entity matching across multiple, disparate data sources. Traditional data integration techniques rely on exact textual or numeric matches to form connections between data entities stored across different data sources. Such techniques fail to account for discrepancies between data records for the same data entity, which leads to duplicate records among other technical deficiencies. To address these technical challenges, some embodiments of the present disclosure leverage a combination of feature space reduction and feature engineering techniques that individually, and/or in combination, enable the generation of improved machine learning models capable of accounting for data discrepancies during a data entity matching process. The feature space reduction techniques, for example, may include the generation of numeric vectors representative of various data attributes from each data source that may be used to identify a subset of match candidate data objects from a target data source. By doing so, the feature space reduction techniques may reduce a large feature space including a plurality of potentially matching candidate data objects to a small subset of objects most likely to match a particular reference data object. This allows for the application of intensive feature engineering techniques for generating features predictive of a match between two data entities. These features may be used to train a data entity matching model and then subsequently used by the data entity matching model to generate match scores between each data object of the small subset of objects and a reference data object. By doing so, some of the feature space reduction techniques and feature engineering techniques of the present disclosure may improve the accuracy and comprehensiveness of data entity match predictions that directly address technical deficiencies of traditional data integration techniques.

In some embodiments, a method includes generating, by one or more processors, a reference numeric vector for a reference data object from a first data source based on a text representation associated with the reference data object; generating, by the one or more processors, a plurality of match candidate numeric vectors for a plurality of match candidate data objects from a second data source based on a plurality of text representations associated with the plurality of match candidate data objects; identifying, by the one or more processors, a subset of match candidate data objects from the plurality of match candidate data objects based on a comparison between the reference numeric vector and the plurality of match candidate numeric vectors; generating, by the one or more processors, a plurality of data features based on a comparison between (a) one or more reference object attributes corresponding to the reference data object and (b) one or more matching object attributes corresponding to the subset of match candidate data objects; and identifying, by the one or more processors and a using an entity matching model, a match between the reference data object and a match candidate data object of the subset of match candidate data objects based on the plurality of data features.

In some embodiments, a system includes memory and one or more processors communicatively coupled to the memory, the one or more processors configured to: generate, by one or more processors, a reference numeric vector for a reference data object from a first data source based on a text representation associated with the reference data object; generate, by the one or more processors, a plurality of match candidate numeric vectors for a plurality of match candidate data objects from a second data source based on a plurality of text representations associated with the plurality of match candidate data objects; identify, by the one or more processors, a subset of match candidate data objects from the plurality of match candidate data objects based on a comparison between the reference numeric vector and the plurality of match candidate numeric vectors; generate, by the one or more processors, a plurality of data features based on a comparison between (a) one or more reference object attributes corresponding to the reference data object and (b) one or more matching object attributes corresponding to the subset of match candidate data objects; and identify, by the one or more processors and a using an entity matching model, a match between the reference data object and a match candidate data object of the subset of match candidate data objects based on the plurality of data features.

In some embodiments, one or more non-transitory computer-readable storage media include instructions that, when executed by one or more processors, cause the one or more processors to: generate, by one or more processors, a reference numeric vector for a reference data object from a first data source based on a text representation associated with the reference data object; generate, by the one or more processors, a plurality of match candidate numeric vectors for a plurality of match candidate data objects from a second data source based on a plurality of text representations associated with the plurality of match candidate data objects; identify, by the one or more processors, a subset of match candidate data objects from the plurality of match candidate data objects based on a comparison between the reference numeric vector and the plurality of match candidate numeric vectors; generate, by the one or more processors, a plurality of data features based on a comparison between (a) one or more reference object attributes corresponding to the reference data object and (b) one or more matching object attributes corresponding to the subset of match candidate data objects; and identify, by the one or more processors and a using an entity matching model, a match between the reference data object and a match candidate data object of the subset of match candidate data objects based on the plurality of data features.

BRIEF DESCRIPTION OF THE DRAWINGS

FIG. 6 is an operational example of discrepancies 605 between data attributes in accordance with some embodiments discussed herein.

DETAILED DESCRIPTION

Figure 1:
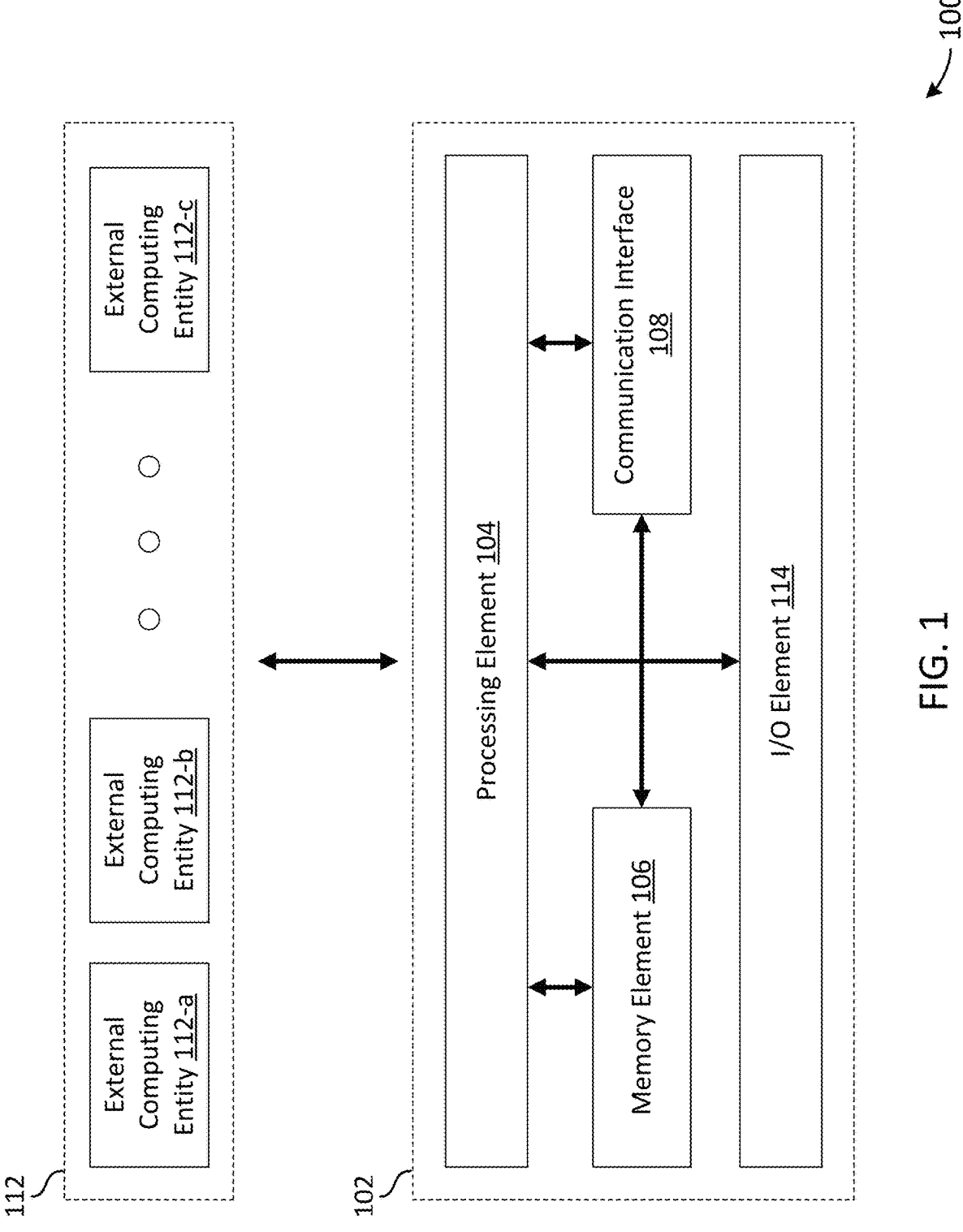
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout. Moreover, while certain embodiments of the present disclosure are described with reference to predictive data analysis, one of ordinary skill in the art will recognize that the disclosed concepts can be used to perform other types of data analysis.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE SYSTEM FRAMEWORK

FIG. 1 illustrates an example computing system 100 in accordance with one or more embodiments of the present disclosure. The computing system 100 may include a predictive computing entity 102 and/or one or more external computing entities 112 (e.g., external computing entity 112-*a*, external computing entity 112-*b*, external computing entity 112-*c*) communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112 to perform one or more steps/operations of one or more techniques (e.g., feature space reduction techniques, data feature engineering techniques, entity matching techniques, and/or the like) described herein.

The external computing entities 112, for example, may include and/or be associated with one or more entities that may be configured to receive, transmit, store, manage, and/or facilitate datasets, such as a dataset including a plurality of match candidate data objects, and/or the like. The external computing entities 112, for example, may include data sources that may provide such datasets, and/or the like to the predictive computing entity 102 which may leverage the datasets to identify potential matches for a reference data object stored at the computing entity 102, and/or the like, as described herein. In some examples, the datasets may include an aggregation of data from across the external computing entities 112 into one or more aggregated datasets. The external computing entities 112, for example, may be associated with one or more data repositories, cloud platforms, compute nodes, organizations, and/or the like, which may be individually and/or collectively leveraged by the predictive computing entity 102 to obtain and aggregate data for a prediction domain.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like, may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
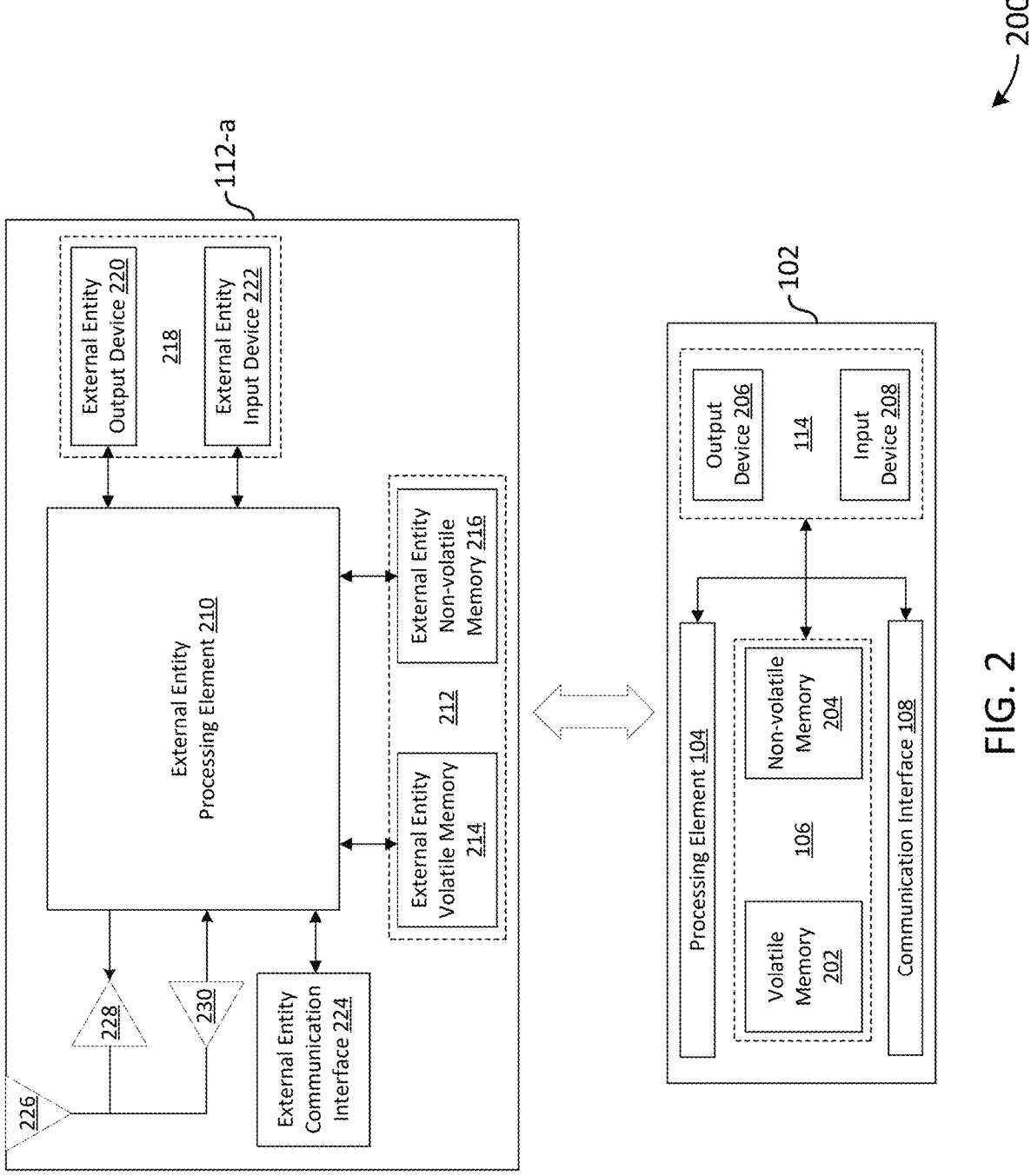
FIG. 2 is a schematic diagram showing a system computing architecture in accordance with one or more embodiments of the present disclosure.

FIG. 2 is a schematic diagram showing a system computing architecture 200 in accordance with some embodiments discussed herein. In some embodiments, the system computing architecture 200 may include the predictive computing entity 102 and/or the external computing entity 112-*a* of the computing system 100. The predictive computing entity 102 and/or the external computing entity 112-*a* may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more steps/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product which includes non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112-*a*. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112-*a* may include an external entity processing element 210, an external entity memory element 212, an external entity communication interface 224, and/or one or more external entity I/O elements 218 that communicate within the external computing entity 112-*a* via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112-*a* may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112-*a* may be capable of operating with one or more air interface standards, communication protocols, modulation types, and access types. More particularly, the external computing entity 112-*a* may operate in accordance with any of a number of wireless communication standards and protocols, such as those described above with regard to the predictive computing entity 102.

Via these communication standards and protocols, the external computing entity 112-*a* may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112-*a* may also download changes, add-ons, and updates, for instance, to its firmware, software (e.g., including executable instructions, applications, program modules), operating system, and/or the like.

According to one embodiment, the external computing entity 112-*a* may include location determining embodiments, devices, modules, functionalities, and/or the like. For example, the external computing entity 112-*a* may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112-*a* in connection with a variety of other systems, including cellular towers, Wi-Fi access points, and/or the like. Similarly, the external computing entity 112-*a* may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112-*a* to interact with and/or cause the display, announcement, and/or the like of information/data to a user. The user input interface may include any of a number of input devices or interfaces allowing the external computing entity 112-*a* to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112-*a* and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. EXAMPLES OF CERTAIN TERMS

In some embodiments, the term "first data source" refers to an information repository or information storage system that includes a plurality of data records corresponding to a plurality of individual data entities. A first data source may include one or more databases storing one or more specific types of data objects as recorded by a first entity. Each data object may correspond to an individual data entity and may be associated with one or more unique identifiers corresponding to the individual data entity. The data objects, for example, may include a plurality of reference data objects that each include a plurality of attributes corresponding to an individual data entity.

An individual data entity may depend on a data matching domain. By way of example, a data matching domain may include a clinical healthcare domain in which an individual data entity may correspond to a member of one or more healthcare networks. In such a case, a first data source may be associated with a healthcare provider and may include information for one or more members of a healthcare plan associated with the healthcare provider. For example, during the course of one or more member interactions, a first entity may collect member information and store the information in association with one or more reference data objects maintained by the first data source.

The first data source may include any type of data storage system described herein. In some examples, using some of the techniques described herein, information stored within the first data source may be compared with information from one or more other data sources to match entities separately represented across the various data sources. For example, some of the techniques described herein may enable data objects from different data sources to be identified as associated with one data entity (e.g., an individual, a member, etc.) even if the data objects are not identical matches (e.g., due to recordation errors, insufficient data, etc.). By doing so, some of the techniques of the present disclosure may account for typographical errors, data object formatting inconsistency, as well as other differences between the representation of a single data entity across different data sources.

In some embodiments, the term "reference numeric vector" refers to an array or string of numeric characters or values. In some examples, the numeric characters or values may represent various types of information associated with an individual data entity (e.g., an individual, a member, etc.). A reference numeric vector may include any quantity of numeric characters. For example, the string "840280350319600790" may be an example of a reference numeric vector. In some examples, a reference numeric vector may be a string of binary values. In some examples, a reference numeric vector may be generated based on a text representation. For example, a text representation including numeric characters, alphabetic characters, and/or whitespace characters may be converted to a numeric vector including a sequence of numeric characters representing the text representation in an encoded format. In some examples, converting a text representation to a numeric vector may decrease a complexity or size of a text representation. Additionally, or alternatively, converting a text representation into a numeric vector may enable one or more operations to be performed more efficiently.

In some embodiments, a reference numeric vector is utilized as a comparable reference point for a reference data object. For example, as described herein, a reference numeric vector may be compared with one or more numeric vectors corresponding with one or more potentially related data objects to determine a similarity between the reference data object and the potentially related data objects.

In some embodiments, a reference numeric vector is generated for a reference data object based on a text representation of the reference data object. For example, a reference numeric representation may be generated by converting a text representation to a numeric vector using one or more vectorization techniques. The vectorization techniques, for example, may include one or more word-level, character-level, and/or any other vectorization technique. In some examples, a reference numeric vector may be generated by applying character-level vectorization techniques to a text representation (e.g., a word-level vectorization may be insufficient due to semantic neutrality of attributes represented by a text representation). By way of example, the vectorization techniques may include one or more vectorization algorithms, such as count vectorization, term frequency-inverse document frequency (TF-IDF), and/or the like.

In some embodiments, the term "text representation" refers to an array or string of characters or values representative of member information. While a numeric vector may be utilized to indicate member information using numeric values, a text representation may be utilized to indicate member information using words, numbers, and spaces. For instance, a text representation may include one or more characters of any type, such as alphabetic characters, numeric characters, punctuation characters, special characters, whitespace characters (e.g., spaces, tabs), emoticons, and/or the like. In some examples, a text representation may include a concatenation of one or more types of entity information as recorded by a data object (e.g., a reference data object, a source data object, etc.). By way of example, a text representation may include a sequence of attributes from a data object. The sequence of attributes may include a predefined attribute sequence that defines an arrangement of one or more attributes that may be reflected by a data object.

A text representation, and/or a predefined attribute sequence, may be based on a data matching domain. For instance, in a clinical context, a text representation may include member information, such as name information, birth date information, social security number information, address information, and/or the like. In such a case, the specified types of information may be extracted from a data object and arranged in accordance with a predefined attribute sequence. The predefined attribute sequence, for example, may define an order of attributes including a name attribute, birth date attribute, and address attribute. In such a case, a text representation for a member may include a text string "Christopher Jones Apr. 26 1926 123 Park Street."

In some embodiments, the term "reference data object" refers to a unit or quantity of data from the first data source that corresponds to a single data entity. For example, a reference data object may include one or more attributes that identify different types of information for the particular data entity. As described herein, a text representation may be generated based on one or more attributes of a reference data object. For example, the text representation may include a plurality of strings, where each string corresponds to an attribute of the reference data object. The plurality of strings may be concatenated, resulting in the formation of the text representation.

A reference data object, and/or the attributes thereof, may depend on a data matching domain. For example, in a clinical context, a reference data object may correspond to a member of a healthcare plan. In such a case, a reference data object may be associated with and/or otherwise include information for a particular member. By way of example, a reference data object may include one or more name attributes, address attributes, date of birth attributes, and gender attributes, among other examples attributes reflective of a characteristic for an individual member.

In some embodiments, the term "reference object attribute" refers to a data attribute of a reference data object. The data attribute may indicate a specific type of information for a data entity, such as a member in a clinical context. For example, a given reference data object may include a plurality of reference object attributes. Each reference object attribute of the plurality of reference object attributes may indicate a specific type of information associated with a data entity. For example, a reference object attribute may be an address attribute, a date of birth attribute, a gender attribute, and/or any other attribute, such as those described herein.

In some embodiments, the term "second data source" refers to an information repository or information storage system that includes a plurality of data records corresponding to a plurality of individual data entities. A second data source may include one or more databases storing one or more specific types of data objects as recorded by a second entity. Each data object may correspond to an individual data entity and may be associated with one or more unique identifiers corresponding to the individual data entity. These unique identifiers may be different, similar, or exactly match the identifier for the same data entity represented within a first data source. The data objects, for example, may include a plurality of match candidate data objects that each include a plurality of attributes corresponding to an individual data entity. Using some of the techniques of the present disclosure, the plurality of attributes may be leveraged to match a matching candidate data object to a reference data object represented within a first data source.

An individual data entity may depend on a data matching domain. By way of example, a data matching domain may include a clinical healthcare domain in which an individual data entity may correspond to a member of one or more healthcare networks. In such a case, a second data source may be associated with a healthcare provider and may include information for one or more members of a healthcare plan associated with the healthcare provider. For example, during the course of one or more member interactions, a second entity may collect member information and store the information is association with one or more match candidate data objects maintained by the second data source. In some examples, the second entity may include a Centers for Medicare and Medicaid Services (CMS) enrollment entity and the second data source may include a CMS enrollee data source.

The second data source may include any type of data storage system described herein. In some examples, using some of the techniques described herein, information stored within the second data source may be compared with information from one or more other data sources to match entities separately represented across the various data sources. For example, some of the techniques described herein may enable data objects from different data sources to be identified as associated with one data entity (e.g., an individual, a member, etc.) even if the data objects are not identical matches (e.g., due to recordation errors, insufficient data, etc.). By doing so, some of the techniques of the present disclosure may account for typographical errors, data object formatting inconsistency, as well as other differences between the representation of a single data entity across different data sources.

In some embodiments, the term "match candidate numeric vector" refers to an array or string of numeric characters or values. In some examples, the numeric characters or values may represent various types of information associated with an individual data entity (e.g., an individual, a member, etc.). A match candidate numeric vector may include any quantity of numeric characters. For example, the string "840280350319600790" may be an example of a match candidate numeric vector. In some examples, a match candidate numeric vector may be a string of binary values. In some examples, a match candidate numeric vector may be generated based on a text representation derived from a match candidate data object. For example, a text representation including numeric characters, alphabetic characters, and/or whitespace characters may be converted to a numeric vector including a sequence of numeric characters representing the text representation in an encoded format. In some examples, converting a text representation to a numeric vector may decrease a complexity or size of a text representation. Additionally, or alternatively, converting a text representation into a numeric vector may enable one or more operations to be performed more efficiently.

In some embodiments, a match candidate numeric vector is utilized as a comparable reference point for a match candidate data object. For example, as described herein, a match candidate numeric vector may be compared with one or more numeric vectors corresponding with one or more potentially related data objects to determine a similarity between the match candidate data object and the potentially related data objects.

In some embodiments, a match candidate numeric vector is generated for a match candidate data object based on a text representation of the match candidate data object. For example, a match candidate numeric representation may be generated by converting a text representation to a numeric vector using one or more vectorization techniques. The vectorization techniques, for example, may include one or more word-level, character-level, and/or any other vectorization technique. In some examples, a match candidate numeric vector may be generated by applying character-level vectorization techniques to a text representation (e.g., a word-level vectorization may be insufficient due to semantic neutrality of attributes represented by a text representation). By way of example, the vectorization techniques may include one or more vectorization algorithms, such as count vectorization, term frequency-inverse document frequency (TF-IDF), and/or the like.

In some embodiments, the term "match candidate data object" refers to a unit or quantity of data from the second data source that corresponds to a single data entity. For example, a match candidate data object may include one or more attributes that identify different types of information for the particular data entity. As described herein, a text representation may be generated based on one or more attributes of a match candidate data object. For example, the text representation may include a plurality of strings, where each string corresponds to an attribute of the match candidate data object. The plurality of strings may be concatenated, resulting in the formation of the text representation.

A match candidate data object, and/or the attributes thereof, may depend on a data matching domain. For example, in a clinical context, a match candidate data object may correspond to a member of a healthcare plan. In such a case, a match candidate data object may be associated with and/or otherwise include information for a particular member. By way of example, a match candidate data object may include one or more name attributes, address attributes, date of birth attributes, and gender attributes, among other examples attributes reflective of a characteristic for an individual member.

In some embodiments, the term "matching object attribute" refers to a data attribute of a match candidate data object. The data attribute may indicate a specific type of information for a data entity, such as a member in a clinical context. For example, a given match candidate data object may include a plurality of matching object attributes. Each matching object attribute of the plurality of matching object attributes may indicate a specific type of information associated with the data entity. For example, a matching object attribute may be an address attribute, a date of birth attribute, a gender attribute, and/or any other attribute, such as those described herein.

In some embodiments, the term "vector attribute pair" refers to a pair of numeric vectors. For example, a vector attribute pair may include a reference numeric vector (e.g., derived from a reference data object from a first data source) and a match candidate numeric vector (e.g., derived from a match candidate data object from a second data source). In some examples, a vector attribute pair may include a first numeric vector from the first data source (e.g., the reference numeric vector) and a second numeric vector from the second data source (e.g., the match candidate numeric vector).

In some embodiments, a vector attribute pair is identified using one or more vector similarity techniques. For instance, one or more vector similarity techniques may be applied to compare two numeric vectors and determine one or more similarity metrics for the vector attribute pair, such as a vector similarity score. In some examples, a vector attribute pair may be selected based on a vector similarity score. In some examples, the vector similarity techniques may be utilized to select a number of vector attribute pairs based on the vector similarity scores. For example, an efficient search algorithm may select a match candidate numeric vector from the second data source based on the efficient search algorithm determining that a similarity score between the match candidate numeric vector and the reference numeric vector satisfies a threshold similarity score.

By way of example, an efficient search algorithm may include an efficient vector similarity searching algorithm, such as Facebook AI Similarity Search (FAISS), and/or the like. In such a case, a plurality of numeric vectors (e.g., including a single reference numeric vector and a plurality of match candidate numeric vectors, etc.) may be represented as an index. A fast nearest neighbors search may be performed based on a Euclidean distance (and/or any other vector distance function, etc.) between each pair of vectors within the index.

By doing so, the similarity search may allow similar vectors to be grouped together, thus eliminating a majority of total match candidates for a given data entity. In some examples, a number of vector attribute pairs may be predefined (e.g., by a user, etc.) to establish an optimal value for k and retrieve only the k most similar vectors to a given reference numeric vector. To reduce a search space, a k may be defined that is significantly less than the original search space of size m and hence allow for the efficient matching of data entities. By way of example, m may include a total number of data entities represented in a second data source and may exceed thousands, millions, and/or the like of data entries depending on a data matching domain, whereas k may be constrained to a small subset of m, such as 4, 10, and/or the like. This, in turn, allows for the application of targeted feature engineering techniques for establishing a relationship between data entities across different data sources.

In addition, or alternatively, a vector similarity threshold may be defined to constrain a number of vector attribute pairs. For example, a number of vector attribute pairs may include each vector attribute pair associated with a vector similarity score that achieves a vector similarity threshold.

In some examples, the vector similarity threshold may be fine-tuned to constrain a total number of vector attribute pairs.

In some embodiments, the term "vector similarity score" refers to a metric used to evaluate or measure the similarity between two numeric vectors. A vector similarity score may include any type of similarity score or metric used to evaluate the similarity between two numeric vectors. For example, a vector similarity score may include a Euclidean distance, a cosine similarity score, and/or any other measure of similarity between two vectors.

In some embodiments, the term "data feature" refers to an engineered data element for facilitating a machine learning comparison between two data entities. In some examples, a data feature may be engineered based on a comparison between data attributes respectively associated with a reference data object and match candidate data object. As described herein, by constraining a search space to a predefined number of candidate data objects, some of the techniques of the present disclosure, enable deep feature engineering techniques for generating a plurality of different features that may be predictive of a match between data entities separately represented across different data sources.

A data feature may depend on a data matching domain. In some examples, a data feature may include one or more string matching features, one or more geographic distance features, and/or the like. A string matching feature, for example, may identify a similarity between a text attribute pair including a reference text attribute and a candidate matching text attribute. A geographic distance feature may identify a similarity between a region attribute pair including reference region attribute and a matching candidate region attribute. While two types of attributes are given as examples, the search space optimization techniques of the present disclosure allow for a generation and consideration of any number and/or type of data features, including, for example, one or more numeric distance features, and/or the like. By way of example, a data feature may include a vector similarity score between a reference numeric vector and a matching candidate numeric vector.

In some embodiments, the term "text attribute pair" refers to a pair of corresponding textual attributes from different data object stored in different data sources. For example, a text attribute pair may include a reference object attribute and a corresponding matching object attribute. The reference object attribute may correspond to a reference data object from the first data source and the matching object attribute may correspond to a match candidate data object from the second data source. In some examples, the corresponding attributes of a text attribute pair may include a textual representation of an attribute. A text attribute pair may depend on a data matching domain. For instance, in a clinical context, a respective text attribute pair may be generated for a member's first name, last name, address, among other attributes that may be represented in a textual form.

In some embodiments, the term "string matching feature" refers to a type of data feature representative of a similarity between two data strings (e.g., of a text attribute pair). For example, a string matching feature may be generated by leveraging one or more string approximation techniques to identify a similarity between two test strings of a text attribute pair. In some examples, a string matching feature may include a Levenshtein distance measure. For example, a string matching feature may identify a quantity of edit operations utilized to match a first string to a second string of a text attribute pair. An edit operation may include an insertion, a deletion, and or a substitution. As an illustrative example, a single edit operation (e.g., a deletion) may be performed on the string "Chriss" to result in the string "Chris." Accordingly, a string edit distance between the string "Chriss" and the string "Chris" may be one. A Levenshtein ratio (e.g., a Levenshtein distance normalized by a quantity of characters in a string) or a Levenshtein distance may be an example of a string matching feature.

In some examples, a text attribute pair may be preprocessed before the generation of a string matching feature. For example, each string in a text attribute pair may be modified to correct a case (e.g., lower-casing all text fields, etc.), remove special characters, and/or the like using regular expressions. Once the text strings are pre-processed, a string matching feature may be generated by computing a Levenshtein distance between the two text strings. The Levenshtein distance may measure a string similarity by counting a number of single-character edits necessary to get from one string to another, as described herein. In some examples, the Levenshtein distance may be calculated as a sum of each edit operation between strings, with identical strings having a distance of zero. To account for the fact that longer strings may be more likely to contain more edits, a Levenshtein ratio may be calculated to normalize the string similarity scores to values between 0 and 1, allowing for a direct comparison between scores, regardless of the string lengths being compared. An example Levenshtein ratio may be denoted as:

$$\text{Levenshtein\_Ratio} = \frac{\text{Length}(\text{String1}) + \text{Length}(\text{String2}) - \text{Levenshtein\_Distance}}{\text{Length}(\text{String1}) + \text{Length}(\text{String2})}$$

In some examples, string matching feature may be generated for a plurality of attributes shared between a reference data object and a candidate matching data object. By way of example, a string matching feature may be generated for a first name, middle name, last name, date of birth, social security number, zip code, address, city, phone number, and/or any other attribute represented by both a reference data object and a candidate matching data object. As described herein, the string matching features from these attributes may be used as features for training a classification model. While the generation of such features is an expensive operation, the search space optimization techniques of the present disclosure, enable such operations by limiting the necessary computation to a subset of potential data entity matches.

In some embodiments, the term "region attribute pair" refers to a pair of corresponding geographical attributes from different data object stored in different data sources. For example, a region attribute pair may include a reference object attribute and a corresponding matching object attribute. The reference object attribute may correspond to a reference data object from the first data source and the matching object attribute may correspond to a match candidate data object from the second data source. In some examples, a region attribute pair may include two attributes indicative of geographic information for one or more data entities. For example, a region attribute of a region attribute pair may include a zip code attribute indicative of a current zip code of a current residence of a member.

In some embodiments, the term "geographic distance feature" refers to a type of data feature representative of a geographic distance between two region attributes of a region attribute pair. For example, a region attribute for a reference data object may be compared to a region attribute for a match candidate data object. The comparison may include determining a geographic distance between the region attribute for the reference data object and the region attribute for the match candidate data object. The geographic distance be an example of the geographic distance feature. In some examples, a Haversine distance between two zip codes may be an example of a geographic distance feature.

In some examples, a plurality of data features may be generated for a machine learning model by using a combination of geographic and string matching techniques. For instance, a pair of zip codes (and/or any other geospatial information) may be leveraged to generate string matching feature, using the techniques described herein, and/or a geographic distance feature. A geographic distance feature, for example, may include a Haversine distance to capture correlations between data entities that are the same, but have moved time to another location. A Haversine formula may be leveraged to measure a distance between two points on a sphere using the latitude and longitude coordinates of both points. To measure the distance between point A and point B, with their respective latitude and longitude coordinates (expressed in Radians), the Haversine formula can be computed as shown below:

$$\text{Distance} = R \times c$$

Where:

$$R = \text{radius of the earth}$$

$$c = 2 \times \arctan2\left(\sqrt{a}, \sqrt{1-a}\right)$$

$$a = \sin^2\left(\frac{\Delta\text{Latitude}}{2}\right) + \cos(\text{Latitude}_A) \times \cos(\text{Latitude}_B) \times \sin^2\left(\frac{\Delta\text{Longitude}}{2}\right)$$

$$\Delta\text{Latitude} = \text{Latitude}_B - \text{Latitude}_A$$

$$\Delta\text{Longitude} = \text{Longitude}_B - \text{Longitude}_A$$

In some embodiments, the term "indicator attribute pair" refers to a pair of corresponding indicator attributes from different data objects stored in different data sources. For example, an indicator attribute pair may include a reference object attribute and a corresponding matching object attribute. The reference object attribute may correspond to a reference data object from the first data source and the matching object attribute may correspond to a match candidate data object from the second data source. In some examples, an indicator attribute pair may include two attributes indicative of a binary indicator for one or more data entities. For example, an indicator attribute of an indicator attribute pair may include a binary indicator that identifies a recorded presence of a characteristic (e.g., a gender, etc.) for a data entity.

In some embodiments, the term "indicator feature" refers to a type of data feature representative of a similarity between two indicator attributes of an indicator attribute pair. For example, an indicator attribute for a reference data object may be compared to an indicator attribute for a match candidate data object. The comparison may include determining a type match between the indicator attribute for the reference data object and the indicator attribute for the match candidate data object. For example, a type match may be indicative of whether two indicator attributes are an exact match. In some examples, an indicator feature may be generated for one or more different types of indicator features, such as a city feature, a state feature, a gender feature, and/or the like.

In some embodiments, the term "entity matching model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). An entity matching model may include one or more machine learning models configured, trained (e.g., jointly, separately, etc.), and/or the like to generate a match score between two data entity represented by different data objects. An entity matching model may include one or more of any type of machine learning model including one or more supervised, unsupervised, semi-supervised, reinforcement learning models, and/or the like. In some examples, an entity matching model may include multiple models configured to perform one or more different stages of a data matching process.

In some examples, an entity matching model may include a binary classification model, such as XGBoost, and/or the like, configured to predict a likelihood of two data entities matching (e.g., a match score, etc.). An entity matching model may be trained using a dataset of confirmed matches (e.g., from past manual investigations, etc.) and/or artificially generated data. The dataset of matches may include a plurality of data features, such as those described herein, to improve a predictive accuracy of an entity matching model using features engineered for a particular matching process.

In some examples, a dataset of known matches may be split into two subsets, one that can be left unchanged to represent the positive class (e.g., matches, etc.) and another that may be perturbed in some way (e.g., via random shuffling of rows for one or more fields, etc.) to represent the negative class (e.g., non-matches). An entity matching model may be trained using such labels. As more data regarding true entity matches becomes available, an entity matching model may be retrained and fine-tuned to ensure that future model performance is maintained or improved.

For a given entity in the first data source (e.g., provider membership data, etc.), model features may be generated for the k most similar entities from the second data source (e.g., CMS Medicare enrollee data, etc.). Once generated, the entity matching model may leverage the features to predict the likelihood that each of the most similar entities is a match for a reference entity. An entity matching model output may be converted to matching scores (e.g., using the sigmoid function) to measure the likelihood of a match.

In some embodiments, the term "match score" refers to an output from a predictive model, such as the entity matching model. A match score may include a probability, ratio, and/or the like that described a likelihood that a reference data object matches a match candidate data object. For example, a reference data object may match a match candidate data object in the event that both data objects are separate representation of the same data entity. In some examples, a match score for a reference data object may be generated, using a machine learning model, for each match candidate data object within a subset of match candidate data objects, k. After obtaining the match scores, a match may be determined between the reference data object and a particular match candidate data object of the subset. In some examples, the match scores may be compared against a matching threshold to identify a true match. For example, two data entities may only be considered a match if a match score exceeds threshold, such as 95%, and/or the like. In some examples, the threshold may be fine-tuned depending on the scenario and/or a tolerance for false positives.

IV. OVERVIEW

Various embodiments of the present disclosure address technical challenges related to the management and utilization of data from multiple data sources. In a variety of data-intensive applications, data associated with a single entity, such as an individual, may be obtained from a variety of sources. In some instances, discrepancies may exist between data received from different sources. As one illustrative example, a first data source and a second data source may store the same attribute for the same individual data entity; however, due to a data recordation error, one of the data sources may inaccurately record the attribute causing a discrepancy between the attribute as individually stored by each of the data sources. Traditional data entity matching techniques that rely on exact matched between two data entity may fail to account for such discrepancy leading to duplicative data records, among other technical problems. These technical problems may have real world impacts. For example, in a clinical context, an insurance provider may fail to identify that a policyholder is also covered by a second insurance provider because the policyholder data may not be identified in a database of the second insurance provider. This may result in increased healthcare costs incurred by the insurance provider. While data from multiple data sources may be manually evaluated for multiple instances of data associated with a single individual, such techniques may be infeasible due to the intractable quantities of data stored by large data sources, such as insurance platforms that manage large amounts of continuously changing memberships.

Various embodiments of the present disclosure provide systems and methods that enable intelligent feature space reduction for large quantities of data from multiple sources. The feature space reduction techniques may include generating numeric vectors representative of various data attributes from each data source. The numeric vectors may provide a basis for efficiently reducing a size of a search space. For example, performing similarity comparison techniques between numeric vectors may be more efficient than performing similarity comparisons for text-based data. Additionally, numeric vectors may be utilized for the selection of a subset of data objects that satisfy a similarity threshold when compared to a reference data object. By doing so, the feature space reduction techniques enable the performance of intensive feature engineering technique for a subset of match candidate data objects with a larger data set of candidate data objects. For instance, using one or more feature engineering techniques of the present disclosure, one or more data features may be generated for the subset of data objects and then utilized as inputs for a data entity matching model. The data entity matching model then generate match scores for each data comparison between a data object of the subset and the reference data object. Each data feature may be predictive of a match between two data entity and account for potential discrepancies between the data individually recorded for each entity. In this manner, the feature engineering techniques, in combination with the feature space reduction techniques, may improve traditional data entity matching techniques by compensating for discrepancies between data sources.

In some examples, the techniques described herein may enable improved data management techniques to determine if data matches are present across multiple data sources. For example, the described techniques may enable a first insurance provider to determine if a policyholder is covered by one or more second insurance providers. In such examples, the first insurance provider may reduce incurred healthcare costs by reallocating some percentage of coverage to the one or more second insurance providers. In some examples, a computing entity may be configured to provide one or more notifications or alerts in response to the identification of data associated with an individual in a given database. For example, a computing entity associated with a first insurance provider may detect that data associated with an individual covered by the first insurance provider is present in a database associated with a second insurance provider. In response, the computing entity may provide a notification or alert that the individual may be covered by the second insurance provider. The notification may then enable improved coordination of benefits between the first insurance provider and the second insurance provider, thereby reducing healthcare costs incurred by the first insurance provider.

Examples of technologically advantageous embodiments of the present disclosure include improved data entity matching techniques that leverage (i) improved feature space reduction techniques, (ii) improved feature engineering techniques, (iii) improved machine learning model and training techniques thereof, among other examples. Other technical improvements and advantages may be realized by one of ordinary skill in the art.

V. EXAMPLE SYSTEM OPERATIONS

As indicated, various embodiments of the present disclosure make important technical contributions to data integration technologies. In particular, systems and methods are disclosed herein that enable efficient and accurate data entity matching despite discrepancies across different data sources. When compared to traditional techniques, some of the techniques of the present disclosure provide increased efficiency, improved data coverage, and reduced operational costs, among other technical advantages.

Figure 3:
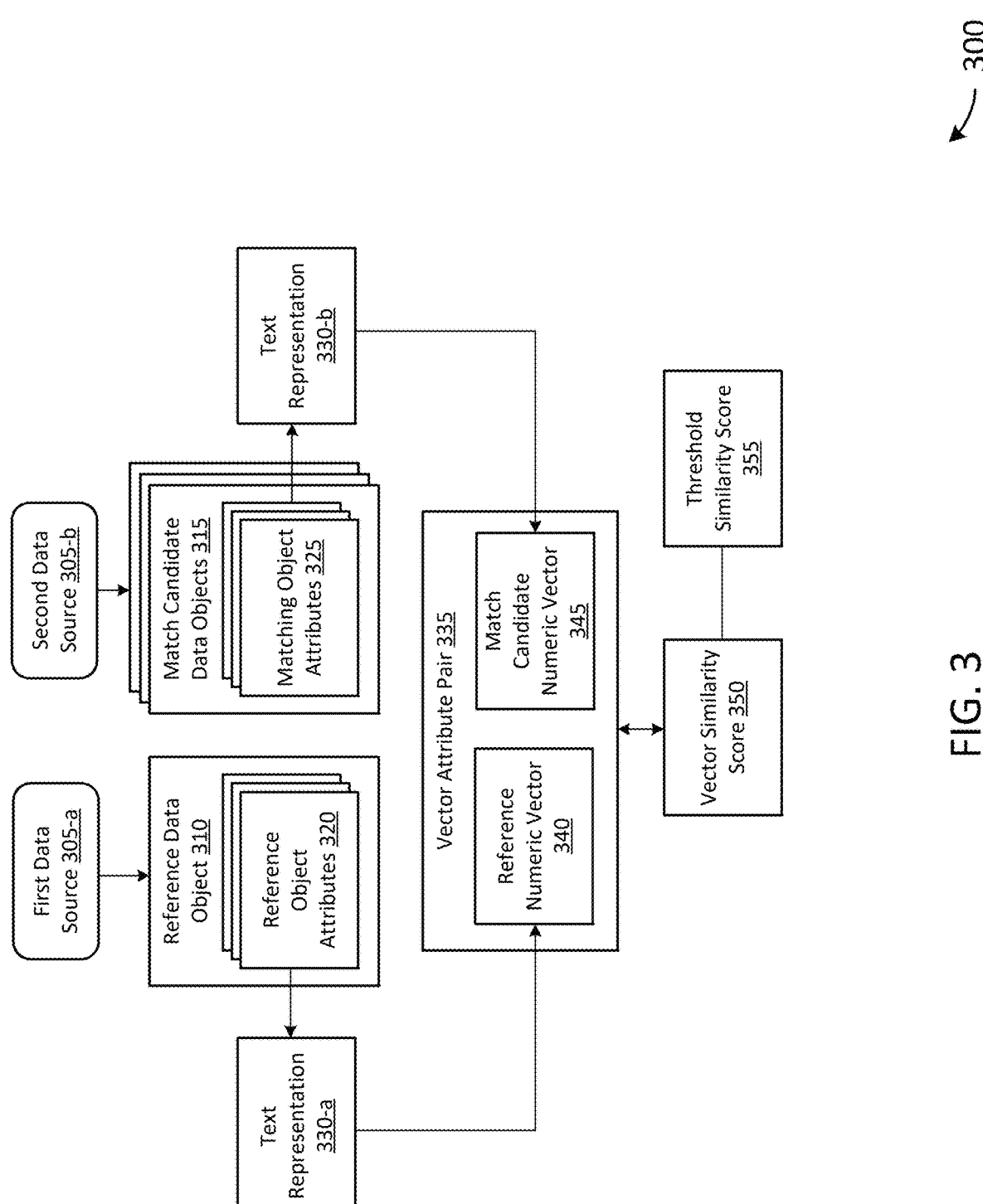
FIG. 3 is a dataflow diagram showing example data structures and modules for feature space reduction techniques in accordance with some embodiments discussed herein.

FIG. 3 is a dataflow diagram 300 showing example data structures and modules for feature space reduction techniques in accordance with some embodiments discussed herein. The dataflow diagram 300 illustrates data structures and modules for reducing a large feature space with a plurality of match candidate data objects 315 to a subset of data objects tailored to a particular reference data object 310. By doing so, feature engineering techniques, as described herein with reference to FIG. 4, may be applied a subset of data objects to generate data features predictive of a match between data object represented by different data sources, such as the first data source 305-a and the second data source 305-b. Generating data features for the subset of data objects as opposed to the plurality of match candidate data objects 315 may result in improved processing efficiency and improved processing speed by way of avoiding the extraneous generation of data features.

In some embodiments, a reference numeric vector 340 for a reference data object 310 may be generated based on a text representation 330-a associated with the reference data object 310. The reference data object 310 may be from a first data source 305-a. In some examples, the text representation 330-a may be generated based on one or more reference object attributes 320.

In some embodiments, a first data source 305-a is an information repository or information storage system that includes a plurality of data records corresponding to a plurality of individual data entities. A first data source 305-a may include one or more databases storing one or more specific types of data objects as recorded by a first entity. Each data object may correspond to an individual data entity and may be associated with one or more unique identifiers corresponding to the individual data entity. The data objects, for example, may include a plurality of reference data objects 310 that each include a plurality of attributes corresponding to an individual data entity.

An individual data entity may depend on a data matching domain. By way of example, a data matching domain may include a clinical healthcare domain in which an individual data entity may correspond to a member of one or more healthcare networks. In such a case, a first data source 305-a may be associated with a healthcare provider and may include information for one or more members of a healthcare plan associated with the healthcare provider. For example, during the course of one or more member interactions, a first entity may collect member information and store the information in association with one or more reference data objects 310 maintained by the first data source 305-a.

The first data source 305-a may include any type of data storage system described herein. In some examples, using some of the techniques described herein, information stored within the first data source 305-a may be compared with information from one or more other data sources 305 to match entities separately represented across the various data sources 305. For example, some of the techniques described herein may enable data objects from different data sources 305 to be identified as associated with one data entity (e.g., an individual, a member, etc.) even if the data objects are not identical matches (e.g., due to recordation errors, insufficient data, etc.). By doing so, some of the techniques of the present disclosure may account for typographical errors, data object formatting inconsistency, as well as other differences between the representation of a single data entity across different data sources 305.

In some embodiments, a reference data object 310 is a unit or quantity of data from the first data source 305-a that corresponds to a single data entity. For example, a reference data object 310 may include one or more attributes that identify different types of information for the particular data entity. As described herein, a text representation 330-a may be generated based on one or more attributes of a reference data object 310. For example, the text representation 330-a may include a plurality of strings, where each string corresponds to an attribute of the reference data object 310. The plurality of strings may be concatenated, resulting in the formation of the text representation 330-a.

A reference data object 310, and/or the reference object attributes 320 thereof, may depend on a data matching domain. For example, in a clinical context, a reference data object 310 may correspond to a member of a healthcare plan. In such a case, a reference data object 310 may be associated with and/or otherwise include information for a particular member. By way of example, a reference data object 310 may include one or more name attributes, address attributes, date of birth attributes, and gender attributes, among other examples attributes reflective of a characteristic for an individual member.

In some embodiments, text representations 330-a and/or 330-b, collectively referenced herein as "text representation 330," are arrays or strings of characters and/or values representative of member information. While a numeric vector may be utilized to indicate member information using numeric values, a text representation 330 may be utilized to indicate member information using words, numbers, and spaces. For instance, a text representation 330 may include one or more characters of any type, such as alphabetic characters, numeric characters, punctuation characters, special characters, whitespace characters (e.g., spaces, tabs), emoticons, and/or the like. In some examples, a text representation 330 may include a concatenation of one or more types of entity information as recorded by a data object (e.g., reference object attributes 320, matching object attributes 325, etc.). By way of example, a text representation 330-*a* may include a sequence of reference object attributes 320 from a reference data object 310. As another example, a text representation 330-*b* may include a sequence of matching object attributes 325 from a match candidate data object 315. The sequence of attributes may include a predefined attribute sequence that defines an arrangement of one or more attributes that may be reflected by a data object.

A text representation 330, and/or a predefined attribute sequence, may be based on a data matching domain. For instance, in a clinical context, a text representation 330 may include member information, such as name information, birth date information, social security number information, address information, and/or the like. In such a case, the specified types of information may be extracted from a data object and arranged in accordance with a predefined attribute sequence. The predefined attribute sequence, for example, may define an order of attributes including a name attribute, birth date attribute, and address attribute. In such a case, a text representation 330 for a member may include a text string "Christopher Jones Apr. 26 1926 123 Park Street."

In some embodiments, a reference numeric vector 340 is an array or string of numeric characters or values. In some examples, the numeric characters or values may represent various types of information associated with an individual data entity (e.g., an individual, a member, etc.). A reference numeric vector 340 may include any quantity of numeric characters. For example, the string "840280350319600790" may be an example of a reference numeric vector 340. In some examples, a reference numeric vector 340 may be a string of binary values. In some examples, a reference numeric vector 340 may be generated based on a text representation 330-*a*. For example, a text representation 330 including numeric characters, alphabetic characters, and/or whitespace characters may be converted to a numeric vector including a sequence of numeric characters representing the text representation 330 in an encoded format. In some examples, converting a text representation 330 to a numeric vector may decrease a complexity or size of a text representation 330. Additionally, or alternatively, converting a text representation 330 into a numeric vector may enable one or more operations to be performed more efficiently.

In some embodiments, a reference numeric vector 340 is utilized as a comparable reference point for a reference data object 310. For example, as described herein, a reference numeric vector 340 may be compared with one or more numeric vectors corresponding with one or more potentially related data objects to determine a similarity between the reference data object 310 and the potentially related data objects.

In some embodiments, a reference numeric vector 340 is generated for a reference data object 310 based on a text representation 330-*a* of the reference data object 310. For example, a reference numeric representation may be generated by converting a text representation 330-*a* to a numeric vector using one or more vectorization techniques. The vectorization techniques, for example, may include one or more word-level, character-level, and/or any other vectorization technique. In some examples, a reference numeric vector 340 may be generated by applying character-level vectorization techniques to a text representation 330-*a* (e.g., a word-level vectorization may be insufficient due to semantic neutrality of attributes represented by a text representation 330). By way of example, the vectorization techniques may include one or more vectorization algorithms, such as count vectorization, term frequency-inverse document frequency (TF-IDF), and/or the like.

In some embodiments, a plurality of match candidate numeric vectors 345 are generated for a plurality of match candidate data objects 315. The plurality of match candidate data objects 315 may be from a second data source 305-*b*. In some examples, the plurality of match candidate numeric vectors 345 may be generated based on a plurality of text representations 330-*b* associated with the plurality of match candidate data objects 315.

In some embodiments, a second data source 305-*b* is an information repository or information storage system that includes a plurality of data records corresponding to a plurality of individual data entities. A second data source 305-*b* may include one or more databases storing one or more specific types of data objects as recorded by a second entity. Each data object may correspond to an individual data entity and may be associated with one or more unique identifiers corresponding to the individual data entity. These unique identifiers may be different, similar, or exactly match the identifier for the same data entity represented within a first data source 305-*a*. The data objects, for example, may include a plurality of match candidate data objects 315 that each include a plurality of attributes corresponding to an individual data entity. Using some of the techniques of the present disclosure, the plurality of attributes may be leveraged to match a matching candidate data object to a reference data object 310 represented within a first data source 305-*a*.

An individual data entity may depend on a data matching domain. By way of example, a data matching domain may include a clinical healthcare domain in which an individual data entity may correspond to a member of one or more healthcare networks. In such a case, a second data source 305-*b* may be associated with a healthcare provider and may include information for one or more members of a healthcare plan associated with the healthcare provider. For example, during the course of one or more member interactions, a second entity may collect member information and store the information is association with one or more match candidate data objects 315 maintained by the second data source 305-*b*.

In some examples, the second entity may include a Centers for Medicare and Medicaid Services (CMS) enrollment entity and the second data source 305-*b* may include a CMS enrollee data source.

The second data source 305-*b* may include any type of data storage system described herein. In some examples, using some of the techniques described herein, information stored within the second data source 305-*b* may be compared with information from one or more other data sources 305 to match entities separately represented across the various data sources 305. For example, some of the techniques described herein may enable data objects from different data sources 305 to be identified as associated with one data entity (e.g., an individual, a member, etc.) even if the data objects are not identical matches (e.g., due to recordation errors, insufficient data, etc.). By doing so, some of the techniques of the present disclosure may account for typographical errors, data object formatting inconsistency, as well as other differences between the representation of a single data entity across different data sources 305.

In some embodiments, a match candidate data object 315 is a unit or quantity of data from the second data source 305-*b* that corresponds to a single data entity. For example, a match candidate data object 315 may include one or more attributes that identify different types of information for the particular data entity. As described herein, a text representation 330-*b* may be generated based on one or more attributes of a match candidate data object 315. For example, the text representation 330-*b* may include a plurality of strings, where each string corresponds to an attribute of the match candidate data object 315. The plurality of strings may be concatenated, resulting in the formation of the text representation 330-*b*.

A match candidate data object 315, and/or the attributes thereof, may depend on a data matching domain. For example, in a clinical context, a match candidate data object 315 may correspond to a member of a healthcare plan. In such a case, a match candidate data object 315 may be associated with and/or otherwise include information for a particular member. By way of example, a match candidate data object 315 may include one or more name attributes, address attributes, date of birth attributes, and gender attributes, among other examples attributes reflective of a characteristic for an individual member.

In some embodiments, a match candidate numeric vector 345 is an array or string of numeric characters or values. In some examples, the numeric characters or values may represent various types of information associated with an individual data entity (e.g., an individual, a member, etc.). A match candidate numeric vector 345 may include any quantity of numeric characters. For example, the string "840280350319600790" may be an example of a match candidate numeric vector 345. In some examples, a match candidate numeric vector 345 may be a string of binary values. In some examples, a match candidate numeric vector 345 may be generated based on a text representation 330-*b* derived from a match candidate data object 315. For example, a text representation 330-*b* including numeric characters, alphabetic characters, and/or whitespace characters may be converted to a numeric vector including a sequence of numeric characters representing the text representation 330-*b* in an encoded format. In some examples, converting a text representation 330 to a numeric vector may decrease a complexity or size of a text representation 330. Additionally, or alternatively, converting a text representation 330 into a numeric vector may enable one or more operations to be performed more efficiently.

In some embodiments, a match candidate numeric vector 345 is utilized as a comparable reference point for a match candidate data object 315. For example, as described herein, a match candidate numeric vector 345 may be compared with one or more numeric vectors corresponding with one or more potentially related data objects to determine a similarity between the match candidate data object 315 and the potentially related data objects.

In some embodiments, a match candidate numeric vector 345 is generated for a match candidate data object 315 based on a text representation 330-*b* of the match candidate data object 315. For example, a match candidate numeric representation may be generated by converting a text representation 330-*b* to a numeric vector using one or more vectorization techniques. The vectorization techniques, for example, may include one or more word-level, character-level, and/or any other vectorization technique. In some examples, a match candidate numeric vector 345 may be generated by applying character-level vectorization techniques to a text representation 330-*b* (e.g., a word-level vectorization may be insufficient due to semantic neutrality of attributes represented by a text representation 330-*b*). By way of example, the vectorization techniques may include one or more vectorization algorithms, such as count vectorization, term frequency-inverse document frequency (TF-IDF), and/or the like.

In some embodiments, a subset of match candidate data objects 315 from the plurality of match candidate data objects 315 are identified based on a comparison between the reference numeric vector 340 and the plurality of match candidate numeric vectors 345. For example, a similarity score 350 may be generated for each of a plurality of vector attribute pairs 335. A match candidate data objects 315 may be selected or otherwise identified as part of a subset of match candidate data objects based on a similarity score 350 for a match candidate numeric vector 345 associated with the match candidate data object 315 and a reference numeric vector 340. In some examples, a vector attribute pair 335 may be compared iteratively, where a single reference numeric vector 340 is iteratively compared to each of a plurality of match candidate numeric vectors 345 respectively corresponding to each of the plurality of match candidate data objects 315.

In some embodiments, a vector similarity score 350 is a metric used to evaluate or measure the similarity between two numeric vectors. A vector similarity score 350 may include any type of similarity score or metric used to evaluate the similarity between two numeric vectors. For example, a vector similarity score 350 may include a Euclidean distance, a cosine similarity score, and/or any other measure of similarity between two vectors.

In some embodiments, the vector attribute pair 335 is a pair of numeric vectors. For example, a vector attribute pair 335 may include a reference numeric vector 340 (e.g., derived from a reference data object 310 from a first data source 305-*a*) and a match candidate numeric vector 345 (e.g., derived from a match candidate data object 315 from a second data source 305-*b*). In some examples, a vector attribute pair 335 may include a first numeric vector from the first data source 305-*a* (e.g., the reference numeric vector 340) and a second numeric vector from the second data source 305-*b* (e.g., the match candidate numeric vector 345).

In some embodiments, a vector attribute pair 335 is identified using one or more vector similarity techniques. For instance, one or more vector similarity techniques may be applied to compare two numeric vectors and determine one or more similarity metrics for the vector attribute pair 335, such as a vector similarity score. In some examples, a vector attribute pair 335 may be selected based on a vector similarity score 350. In some examples, the vector similarity techniques may be utilized to select a number of vector attribute pairs 335 based on the vector similarity scores 350. For example, an efficient search algorithm may select a match candidate numeric vector 345 from the second data source 305-*b* based on the efficient search algorithm determining that a vector similarity score 350 between the match candidate numeric vector 345 and the reference numeric vector 340 satisfies a threshold similarity score 355.

By way of example, an efficient search algorithm may include an efficient vector similarity searching algorithm, such as Facebook AI Similarity Search (FAISS), and/or the like. In such a case, a plurality of numeric vectors (e.g., including a single reference numeric vector 340 and a plurality of match candidate numeric vectors 345, etc.) may be represented as an index. A fast nearest neighbors search may be performed based on a Euclidean distance (and/or any other vector distance function, etc.) between each pair of vectors within the index.

By doing so, the similarity search may allow similar vectors to be grouped together, thus eliminating a majority of total match candidates for a given data entity. In some examples, a number of vector attribute pairs may be pre-defined (e.g., by a user, etc.) to establish an optimal value for k and retrieve only the k most similar vectors to a given reference numeric vector 340. To reduce a search space, a k may be defined that is significantly less than the original search space of size m and hence allow for the efficient matching of data entities. By way of example, m may include a total number of data entities represented in a second data source and may exceed thousands, millions, and/or the like of data entries depending on a data matching domain, whereas k may be constrained to a small subset of m, such as 4, 10, and/or the like. This, in turn, allows for the application of targeted feature engineering techniques for establishing a relationship between data entities across different data sources, as described in further detail with reference to FIG. 4.

In addition, or alternatively, a vector similarity threshold may be defined to constrain a number of vector attribute pairs 335. For example, a number of vector attribute pairs 335 may include each vector attribute pair associated with a vector similarity score that achieves a vector similarity threshold. In some examples, the vector similarity threshold may be fine-tuned to constrain a total number of vector attribute pairs 335.

In some embodiments, a subset of match candidate data objects is identified from the plurality of match candidate data objects based on the threshold similarity score 355. For example, the subset of match candidate data objects from the plurality of match candidate data objects 315 may be selected based on a comparison between the vector similarity score 350 and the threshold similarity score 355. In addition, or alternatively, the subset of match candidate data objects is identified from the plurality of match candidate data objects 315 based on a plurality of vector similarity scores corresponding to the plurality of match candidate data objects 315. For example, the subset of match candidate data objects may be selected from the plurality of match candidate data objects based on the vector similarity score 350, a plurality of vector similarity scores corresponding to the plurality of match candidate data objects, and a threshold number of candidate data objects. In this manner, a search space may be effectively reduced from a plurality of match candidate data objects 315 to a constrained subset thereof; thereby, allowing the practical application of feature engineering techniques to establish a relationship between the reference data object 310 and at least one of the match candidate data objects. Example feature engineering techniques will now be discussed in further detail with reference to FIG. 4

Figure 4:
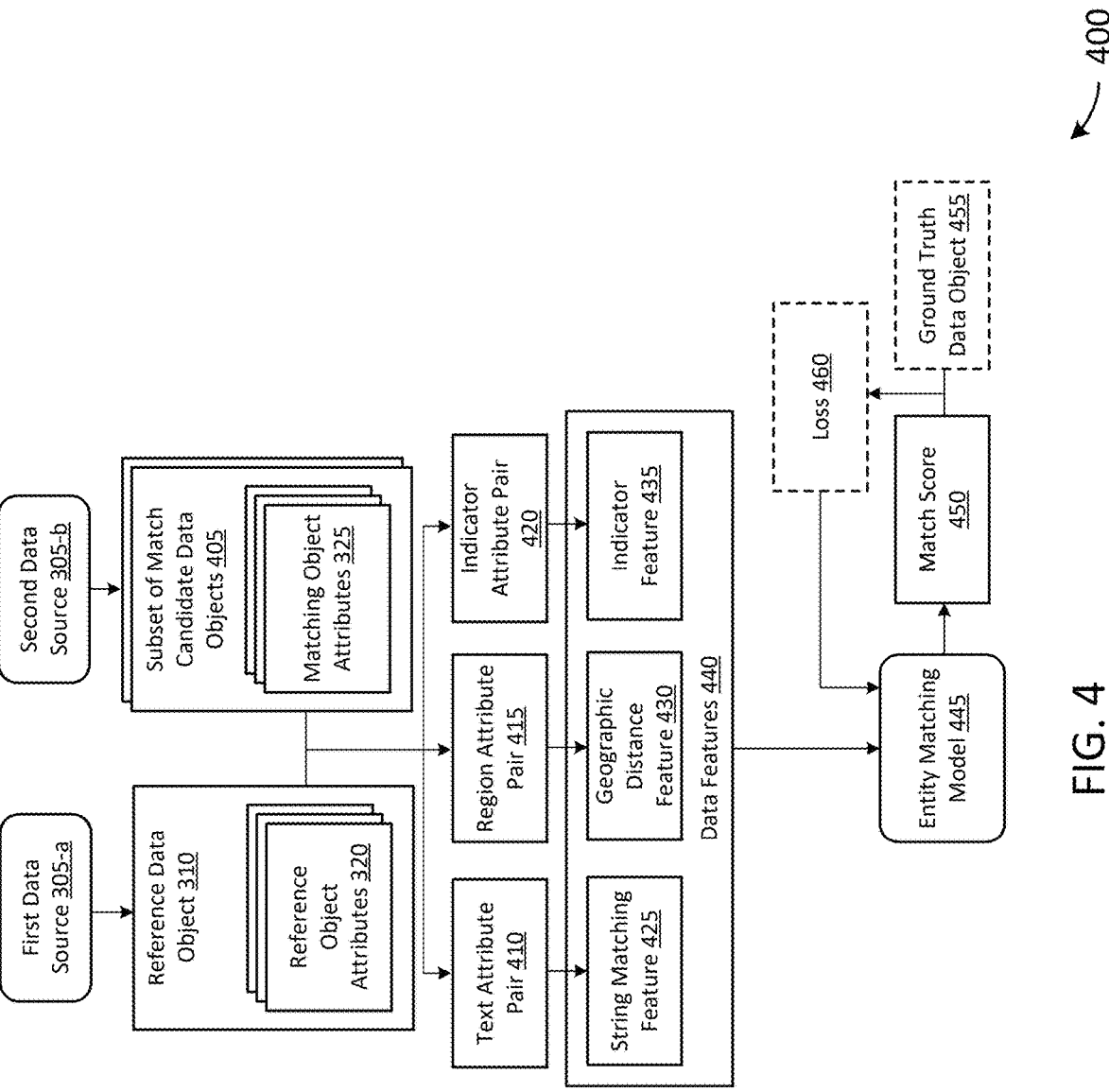
FIG. 4 is a dataflow diagram showing example data structures and modules for establishing an entity match using one or more engineered features in accordance with some embodiments discussed herein.

FIG. 4 is a dataflow diagram 400 showing example data structures and modules for establishing an entity match using one or more engineered features in accordance with some embodiments discussed herein. The dataflow diagram 400 illustrates data structures and modules for engineering data features 440 predictive of a data entity match between the reference data object 310 and one or more of a subset of match candidate data object 405. As described herein, the data features 440 are generated for a subset of match candidate data objects 405 as opposed to the plurality of match candidate data objects 315, which may result in improved processing efficiency and improved processing speed by way of avoiding the extraneous generation of data features.

In some embodiments, a plurality of data features may be generated based on a comparison between one or more reference object attributes 320 corresponding to the reference data object 310 and one or more matching object attributes 325 corresponding to the subset of match candidate data objects 405. By generating the plurality of data features for the subset of match candidate data objects 405 as opposed to the plurality of match candidate data objects 315, processing resources may be conserved.

In some embodiments, a match between the reference data object 310 and a match candidate data object 315 of the subset of match candidate data objects 315 may be identified. In some examples, the match may be identified using an entity matching model 445. Additionally, or alternatively, the match may be identified based on the plurality of data features. By way of example, the entity match may be identified by the entity matching model 445 using a plurality of data features as input.

In some embodiments, an entity matching model 445 is a data entity that describes parameters, hyper-parameters, and/or defined operations of a rules-based and/or machine learning model (e.g., model including at least one of one or more rule-based layers, one or more layers that depend on trained parameters, coefficients, and/or the like). The entity matching model 445 may include one or more machine learning models configured, trained (e.g., jointly, separately, etc.), and/or the like to generate a match score between two data entity represented by different data objects. The entity matching model 445 may include one or more of any type of machine learning model including one or more supervised, unsupervised, semi-supervised, reinforcement learning models, and/or the like. In some examples, the entity matching model 445 may include multiple models configured to perform one or more different stages of a data matching process.

In some examples, the entity matching model 445 may include a binary classification model, such as XGBoost, and/or the like, configured to predict a likelihood of two data entities matching (e.g., a match score, etc.). The entity matching model 445 may be trained using a dataset of confirmed matches (e.g., from past manual investigations, etc.) and/or artificially generated data. The dataset of matches may include a plurality of data features, such as those described herein, to improve a predictive accuracy of the entity matching model 445 using features engineered for a particular matching process.

In some examples, the dataset of known matches may be split into two subsets, one that can be left unchanged to represent the positive class (e.g., matches, etc.) and another that may be perturbed in some way (e.g., via random shuffling of rows for one or more fields, etc.) to represent the negative class (e.g., non-matches). The entity matching model 445 may be trained using such labels. As more data regarding true entity matches becomes available, the entity matching model 445 may be retrained and fine-tuned to ensure that future model performance is maintained or improved.

For a given entity in the first data source 305-a (e.g., provider membership data, etc.), model features may be generated for the k most similar entities from the second data source 305-b (e.g., CMS Medicare enrollee data, etc.). Once generated, the entity matching model 445 may leverage the features to predict the likelihood that each of the most similar entities is a match for a reference entity. The entity matching model output may be converted to matching scores 450 (e.g., using the sigmoid function, and/or any other activation function) to measure the likelihood of a match.

In some embodiments, a data feature is an engineered data element for facilitating a machine learning comparison between two data entities. In some examples, a data feature may be engineered based on a comparison between data attributes respectively associated with a reference data object 310 (e.g., reference object attributes 320) and a match candidate data object 315 (e.g., matching object attributes 325). As described herein, by constraining a search space to a predefined number of candidate data objects, some of the techniques of the present disclosure, enable deep feature engineering techniques for generating a plurality of different features that may be predictive of a match between data entities separately represented across different data sources 305.

In some embodiments, a reference object attribute 320 is a data attribute of a reference data object 310. The data attribute may indicate a specific type of information for a data entity, such as a member in a clinical context. For example, a given reference data object 310 may include a plurality of reference object attributes 320. Each reference object attribute 320 of the plurality of reference object attributes 320 may indicate a specific type of information associated with a data entity. For example, a reference object attribute 320 may be an address attribute, a date of birth attribute, a gender attribute, and/or any other attribute, such as those described herein.

In some embodiments, a matching object attribute 325 is a data attribute of a match candidate data object 315. The data attribute may indicate a specific type of information for a data entity, such as a member in a clinical context. For example, a given match candidate data object 315 may include a plurality of matching object attributes 325. Each matching object attribute 325 of the plurality of matching object attributes 325 may indicate a specific type of information associated with the data entity. For example, a matching object attribute 325 may be an address attribute, a date of birth attribute, a gender attribute, and/or any other attribute, such as those described herein.

In some embodiments, each data feature is generated based on a comparison between a matching object attribute 325 and a reference object attribute 320. The data features may depend on a data matching domain. In some examples, a data feature may include one or more string matching features 425, one or more geographic distance features 430, one or more indicator features 435, and/or the like.

In some embodiments, a string matching feature 425 identifies a similarity between a text attribute pair 410 including a reference text attribute and a candidate matching text attribute. For example, the plurality of data features may include a string matching feature 425 corresponding to a text attribute pair 410. The text attribute pair 410 may include a reference object attribute 320 of the one or more reference object attributes 320 and a matching object attribute 325 of the one or more matching object attributes 325. The reference object attribute 320 may be a first text string corresponding to the reference data object 310 and the matching object attribute 325 may be a second text string corresponding to a match candidate data object.

In some embodiments, a text attribute pair 410 is a pair of corresponding textual attributes from different data object stored in different data sources 305. For example, a text attribute pair 410 may include a reference object attribute 320 and a corresponding matching object attribute 325. The reference object attribute 320 may correspond to a reference data object 310 from the first data source 305-*a* and the matching object attribute 325 may correspond to a match candidate data object from the second data source 305-*b*. In some examples, the corresponding attributes of a text attribute pair 410 may include a textual representation of an attribute. A text attribute pair 410 may depend on a data matching domain. For instance, in a clinical context, a respective text attribute pair 410 may be generated for a member's first name, last name, address, among other attributes that may be represented in a textual form.

In some embodiments, a string matching feature 425 is a type of data feature representative of a similarity between two data strings (e.g., of a text attribute pair 410). For example, a string matching feature 425 may be generated by leveraging one or more string approximation techniques to identify a similarity between two test strings of a text attribute pair 410. In some examples, a string matching feature 425 may include a Levenshtein distance measure. For example, a string matching feature 425 may identify a quantity of edit operations utilized to match a first string to a second string of a text attribute pair 410. An edit operation may include an insertion, a deletion, and or a substitution. As an illustrative example, a single edit operation (e.g., a deletion) may be performed on the string "Chriss" to result in the string "Chris." Accordingly, a string edit distance between the string "Chriss" and the string "Chris" may be one. A Levenshtein ratio (e.g., a Levenshtein distance normalized by a quantity of characters in a string) or a Levenshtein distance may be an example of a string matching feature 425.

In some examples, a text attribute pair 410 may be preprocessed before the generation of a string matching feature 425. For example, each string in a text attribute pair 410 may be modified to correct a case (e.g., lower-casing all text fields, etc.), remove special characters, and/or the like using regular expressions. Once the text strings are preprocessed, a string matching feature 425 may be generated by computing a Levenshtein distance between the two text strings. The Levenshtein distance may measure a string similarity by counting a number of single-character edits necessary to get from one string to another, as described herein. In some examples, the Levenshtein distance may be calculated as a sum of each edit operation between strings, with identical strings having a distance of zero. To account for the fact that longer strings may be more likely to contain more edits, a Levenshtein ratio may be calculated to normalize the string similarity scores to values between 0 and 1, allowing for a direct comparison between scores, regardless of the string lengths being compared. An example Levenshtein ratio may be denoted as:

$$\text{Levenshtein\_Ratio} =$$
$$\frac{\text{Length}(\text{String1}) + \text{Length}(\text{String2}) - \text{Levenshtein\_Distance}}{\text{Length}(\text{String1}) + \text{Length}(\text{String2})}$$

In some examples, string matching feature 425 may be generated for a plurality of attributes shared between a reference data object 310 and a candidate matching data object. By way of example, a string matching feature 425 may be generated for a first name, middle name, last name, date of birth, social security number, zip code, address, city, phone number, and/or any other attribute represented by both a reference data object 310 and a candidate matching data object. As described herein, the string matching features 425 from these attributes may be used as features for training a classification model. While the generation of such features is an expensive operation, the search space optimization techniques of the present disclosure, enable such operations by limiting the necessary computation to a subset of potential data entity matches (e.g., the subset of match candidate data objects 405).

In some embodiments, a geographic distance feature 430 identifies a similarity between a region attribute pair 415 including a reference region attribute and a matching candidate region attribute. For example, the plurality of data features may include a geographic distance feature 430 corresponding to a region attribute pair 415. In some examples, the region attribute pair 415 may include a reference object attribute 320 of the one or more reference object attributes 320 and a matching object attribute 325 of the one or more matching object attributes 325. The reference object attribute 320 may be a first region identifier (e.g., a first zip code, etc.) corresponding to the reference data object 310 and the matching object attribute 325 may be a second region identifier (e.g., a second zip code, etc.) corresponding to a match candidate data object of the subset of match candidate data objects 405.

In some embodiments, a geographic distance feature 430 is a type of data feature representative of a geographic distance between two region attributes of a region attribute pair 415. For example, a region attribute for a reference data object 310 may be compared to a region attribute for a match candidate data object. The comparison may include determining a geographic distance between the region attribute for the reference data object 310 and the region attribute for the match candidate data object. The geographic distance be an example of the geographic distance feature 430. In some examples, a Haversine distance between two zip codes may be an example of a geographic distance feature 430.

In some examples, a plurality of data features may be generated for a machine learning model by using a combination of geographic and string matching techniques. For instance, a pair of zip codes (and/or any other geospatial information) may be leveraged to generate string matching feature 425, using the techniques described herein, and/or a geographic distance feature 430. A geographic distance feature 430, for example, may include a Haversine distance to capture correlations between data entities that are the same, but have moved over time to another location. A Haversine formula may be leveraged to measure a distance between two points on a sphere using the latitude and longitude coordinates of both points. To measure the distance between point A and point B, with their respective latitude and longitude coordinates (expressed in Radians), the Haversine formula can be computed as shown below:

$$\text{Distance} = R \times c$$

$$\text{Where:}$$

$$R = \text{radius of the earth}$$

$$c = 2 \times \arctan2\left(\sqrt{a},\ \sqrt{1-a}\right)$$

$$a = \sin^2\left(\frac{\Delta\text{Latitude}}{2}\right) + \cos(\text{Latitude}_A) \times \cos(\text{Latitude}_B) \times \sin^2\left(\frac{\Delta\text{Longitude}}{2}\right)$$

$$\Delta\text{Latitude} = \text{Latitude}_B - \text{Latitude}_A$$

$$\Delta\text{Longitude} = \text{Longitude}_B - \text{Longitude}_A$$

In some embodiments, the plurality of data features includes an indicator feature 435 corresponding to an indicator attribute pair 420. In some examples, the indicator attribute pair 420 may include a reference object attribute 320 of the one or more reference object attributes 320 and matching object attribute 325 of the one or more matching object attributes 325. The reference object attribute 320 may be a first indicator attribute of the one or more reference object attributes 320 and the matching object attribute 325 may be a second indicator attribute of one or more match candidate data objects of the subset of match candidate data objects 405.

In some embodiments, an indicator attribute pair 420 is a pair of corresponding indicator attributes from different data objects stored in different data sources 305. For example, an indicator attribute pair 420 may include a reference object attribute 320 and a corresponding matching object attribute 325. The reference object attribute 320 may correspond to a reference data object 310 from the first data source 305-a and the matching object attribute 325 may correspond to a match candidate data object from the second data source 305-b. In some examples, an indicator attribute pair 420 may include two attributes indicative of a binary indicator for one or more data entities. For example, an indicator attribute of an indicator attribute pair 420 may include a binary indicator that identifies a recorded presence of a characteristic (e.g., a gender, etc.) for a data entity.

In some embodiments, an indicator feature 435 is a type of data feature representative of a similarity between two indicator attributes of an indicator attribute pair 420. For example, an indicator attribute for a reference data object 310 may be compared to an indicator attribute for a match candidate data object. The comparison may include determining a type match between the indicator attribute for the reference data object 310 and the indicator attribute for the match candidate data object. For example, a type match may be indicative of whether two indicator attributes are an exact match. In some examples, an indicator feature 435 may be generated for one or more different types of indicator features 435, such as a city feature, a state feature, a gender feature, and/or the like. In some embodiments, the plurality of data features includes a vector similarity score corresponding to a vector attribute pair, where the vector attribute pair includes the reference numeric vector corresponding to the reference data object 310, and a respective candidate numeric vector of the plurality of match candidate numeric vectors that corresponds to a match candidate data object of the subset of match candidate data objects 405.

In some embodiments, entity matching model 445 is trained, using one or more supervised training techniques, based on a plurality of ground truth data objects. For instance, the reference data object 310 may be associated with a ground truth data object 455). In some examples, one or more parameters of the entity matching model 445 may be updated based on a comparison between the ground truth data object 455 and a match score for one or more of the subset of match candidate data objects 405. For example, a loss value 460 may be computed based on the comparison and the one or more parameters of the entity matching model 445 may be modified based on the loss value 460.

In some embodiments, the entity matching model 445 is trained, using the data features 440, to generate a match score 450 for one or more of the subset of match candidate data objects 405. The match score 450 is an output from a predictive model, such as the entity matching model 445 and may include a probability, ratio, and/or the like that describes a likelihood that a reference data object 310 matches a match candidate data object. For example, a reference data object 310 may match a match candidate data object in the event that both data objects are separate representations of the same data entity. In some examples, a match score 450 for a reference data object 310 may be generated, using a machine learning model, for each match candidate data object within a subset of match candidate data objects 405, k. After obtaining the match scores 450, a match may be determined between the reference data object 310 and a particular match candidate data object of the subset. In some examples, the match scores 450 may be compared against a matching threshold to identify a true match. For example, two data entities may only be considered a match if a match score 450 exceeds a threshold, such as 95%, and/or the like. In some examples, the threshold may be fine-tuned depending on the scenario and/or a tolerance for false positives.

Figure 5:
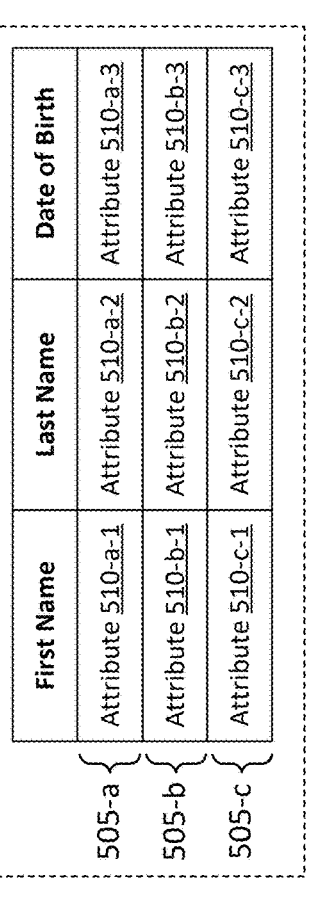
FIG. 5 is an operational example of data source ecosystem in accordance with some embodiments discussed herein.

FIG. 5 is an operational example of data source ecosystem 500 in accordance with some embodiments discussed herein. The data source ecosystem 500 includes multiple disparate data sources, including the first data source 305-*a* and the second data source 305-*b*. One or more of the data sources may be managed by different entities or organizations. The first data source 305-*a* may include a first plurality of data objects 505 (e.g., the data object 505-*a*, the data object 505-*b*, the data object 505-*c*, etc.). The second data source 305-*b* may include a second plurality of data objects (e.g., the data object 315-*a*, the data object 315-*b*, the data object 315-*c*, etc.) that are different than the first plurality of data objects 505. The second plurality of data objects may include the plurality of match candidate data objects 315. At least one of the first plurality of data objects 505 may include the reference data object.

In some embodiments, each of the first plurality of data objects 505 include one or more attributes 510. For instance, a first data object 505-*a* may include a first attribute 510-*a*-1, a second attribute 510-*a*-2, a third attribute 510-*a*-3, and/or the like. A second data object 505-*b* may include a first attribute 510-*b*-1, a second attribute 510-*b*-2, a third attribute 510-*b*-3, and/or the like. A third data object 505-*c* may include a first attribute 510-*c*-1, a second attribute 510-*c*-2, a third attribute 510-*c*-3, and/or the like.

In some embodiments, each of the match candidate data objects 315 include one or more matching object attributes 325. For instance, a match candidate data objects 315-*a* may include a first attribute 325-*a*-1, a second attribute 325-*a*-2, a third attribute 325-*a*-3, and/or the like. A second match candidate data object 315-*b* may include a first attribute 325-*b*-1, a second attribute 325-*b*-2, a third attribute 325-*b*-3, and/or the like. A third match candidate data object 315 may include a first attribute 325-*c*-1, a second attribute 325-*c*-2, a third attribute 325-*c*-3, and/or the like.

Each attribute may include one or more characters indicative of information associated with a data entity. For example, the attribute 320-*a*-1 may include one or more characters that indicate a first name of a data entity. In accordance with one or more examples described herein, one or more processing techniques may be utilized to determine if one or more data objects 505 and one or more matching candidate data objects 315 are associated with a same data entity. Such data matching techniques may enable data matches to be identified (e.g., data objects associated with a same entity), which may improve operational accuracy for systems and techniques that depend on the identification of data entities across multiple platforms.

FIG. 6 is an operational example 600 of discrepancies 605 between data attributes in accordance with some embodiments discussed herein. The operational example 600 includes the first plurality of data objects 505 and the plurality of matching candidate data objects 315. As described herein, various discrepancies 605 may exist between attribute pairs. For example, the first data object 505-*a* and the first matching candidate data object 315-*a* may be associated with a single data entity (e.g., Victoria Hensh); however, a discrepancy 605 may exist between the first name attribute of the first data object 505-*a* and the first name attribute of the first matching candidate data object 315-*a*. Such discrepancies 605 may be the result of typographical errors or various other inconsistencies associated with manual or automated data entry. In accordance with one or more examples described herein, one or more processing techniques may be utilized to determine if one or more data objects 310 and one or more match candidate data objects 315 are associated with a same data entity despite the existence of various types of discrepancies 605. Such data matching techniques may enable data matches to be identified (e.g., data objects associated with a same entity), which may improve operational accuracy for systems and techniques that depend on the identification of data entities across multiple platforms.

Figure 7:
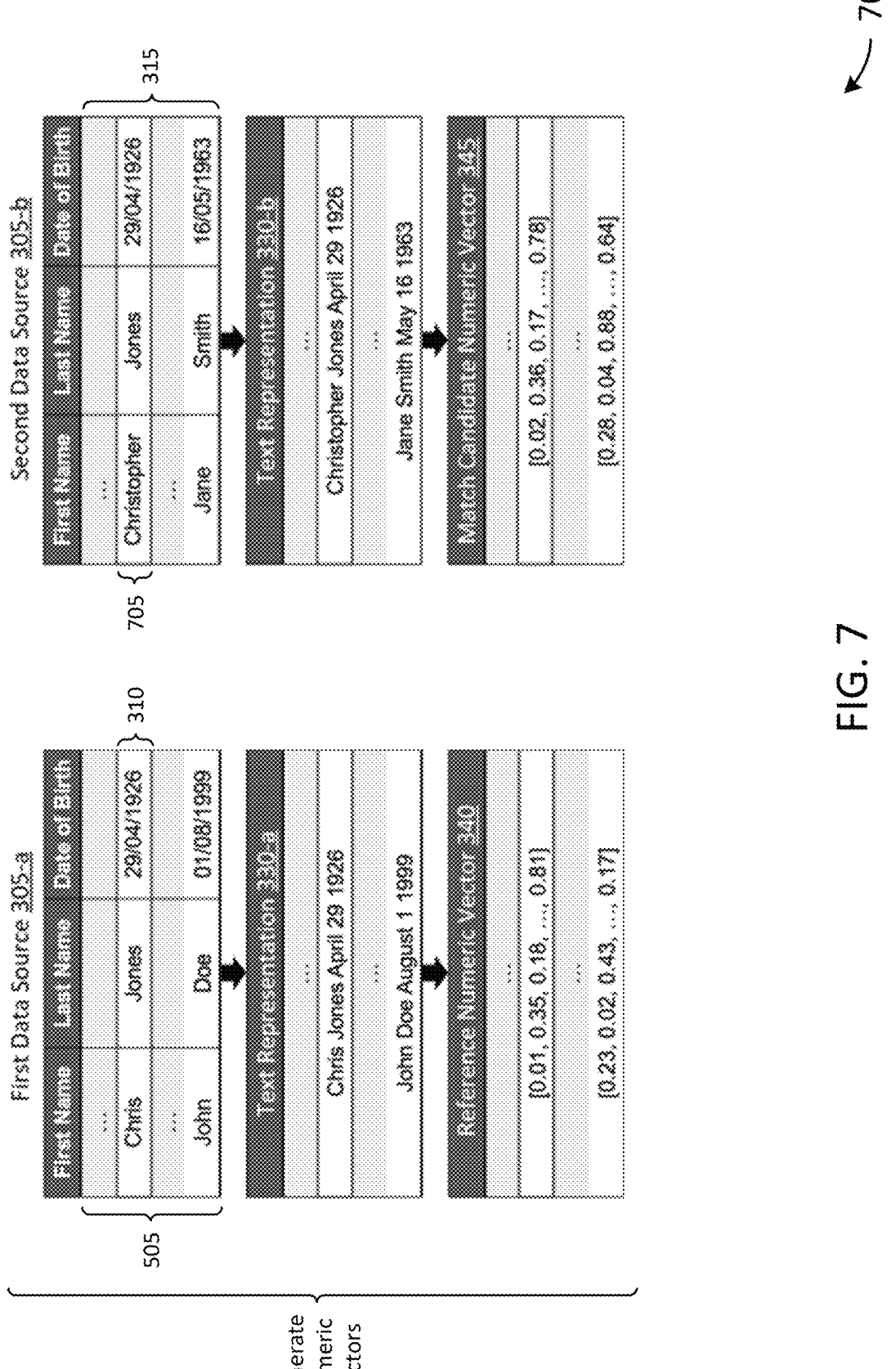
FIG. 7 is an operational example of a vectorization approach for reducing a search space in accordance with some embodiments discussed herein.

FIG. 7 is an operational example 700 of a vectorization approach for reducing a search space in accordance with some embodiments discussed herein. The operational example 700 includes the first plurality of data objects 505 (e.g., from a primary data source, etc.) and the plurality of matching candidate data objects 315 (e.g., from a secondary data source, etc.). As shown, a reference data object 310 from the first plurality of data objects 505 and a matching data object 705 from the plurality of matching candidate data objects 315 may correspond to a single data entity (e.g., Chris Jones), although a discrepancy in the first name data attribute pair may exist across the two data sources. In accordance with one or more examples described herein, a text representation 330-*a* (e.g., first member string, etc.) may be generated for the reference data object 310 and a text representation 330-*b* (e.g., second member string, etc.) may be generated for the matching data object 705. The respective text representations may then be utilized to generate respective numeric vectors representing the respective data object. For example, the text representation 330-*a* may be vectorized to generate a reference numeric vector 340, whereas the text representation 330-*b* may be vectorized to generate a match candidate numeric vector 345. The vectors may be compared to evaluate a degree of dissimilarity between corresponding data objects. For example, a similarity score may be generated for a vector attribute pair, which may be subsequently utilized to determine a subset of match candidate data objects from the second data source 305-*b* that satisfy a similarity threshold with a reference data object 310 (e.g., from the first data source 305-*a*). Such techniques may enable an entirety of a data source to be efficiently searched for potential match candidate data objects, which may conserve processing resources. For example, the comparison of numeric vectors may be a relatively efficient operation when compared to other techniques for evaluating potential data matches.

Figure 8:
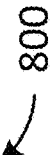
FIG. 8 is an operational example of a search space optimization technique in accordance with some embodiments discussed herein.
Figure 8:
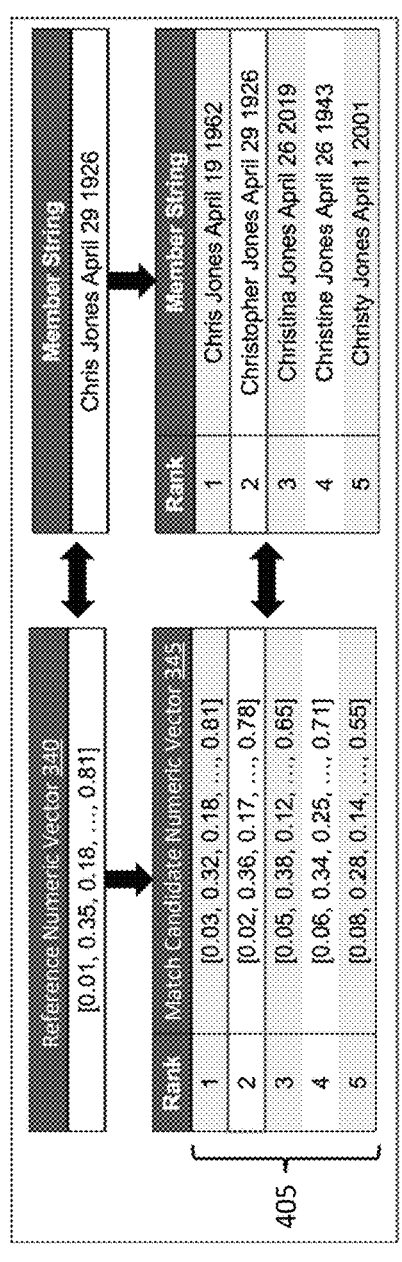

FIG. 8 is an operational example 800 of a search space optimization technique in accordance with some embodiments discussed herein. For example, the operational example 800 illustrates a subset of match candidate data objects 405 (e.g., k=5) that are identified based on one or more match candidate numeric vectors 345 that satisfy a similarity threshold with respect to the reference numeric vector 340. Each match candidate numeric vector may correspond to a text representation, which may be associated with or otherwise derived from a match candidate data object. Accordingly, each data object associated with a match candidate numeric vector included in the subset of match candidate data objects 405 (e.g., rank 1 through rank 5) may be selected for subsequent data feature generation, as described in further detail with reference to FIG. 9. Accordingly, by reducing the quantity of data utilized for data feature generation, processing efficiency may be increased.

Figure 9:
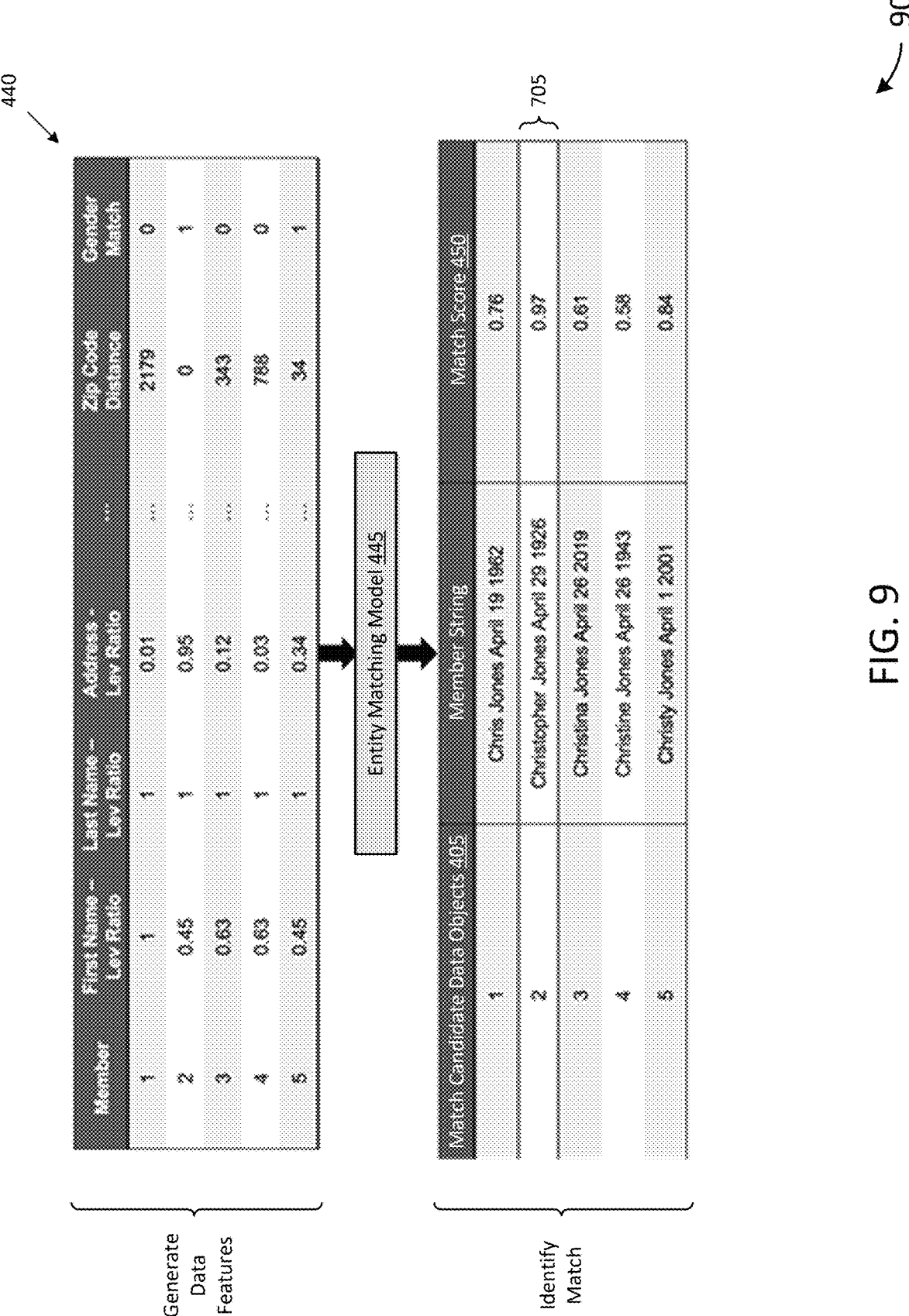
FIG. 9 is an operational example of a data feature engineering techniques for improved data entity matching in accordance with some embodiments discussed herein.

FIG. 9 is an operational example 900 of a data feature engineering techniques for improved data entity matching in accordance with some embodiments discussed herein. For example, the operational example 900 includes a plurality of data features 440 respectively engineered for each of the subset of match candidate data objects 405. The plurality of data features 440, for example, may include a first name Levenshtein ratio, a last name Levenshtein ratio, an address Levenshtein ratio, a zip code distance, and a gender match, among other examples of data features. The plurality of data features 440 may be input to an entity matching model 445 that outputs a match score 450 for each of the subset of match candidate data objects 405 based on the plurality of data features 440. A matching data object 705 may be identified based on the match scores 450. For example, the matching data object 705 (e.g., member 2, etc.) may be identified as a match with a reference data object if the match score 450 is above a threshold value (e.g., 0.9). By identifying matching data objects, operational accuracy may be improved for systems that depend on the identification of data entities across multiple platforms.

Figure 10:
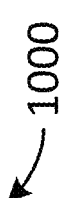
FIG. 10 is a flowchart diagram of an example process for determining whether dissimilar information is associated with a single entity in accordance with some embodiments discussed herein.
Figure 10:
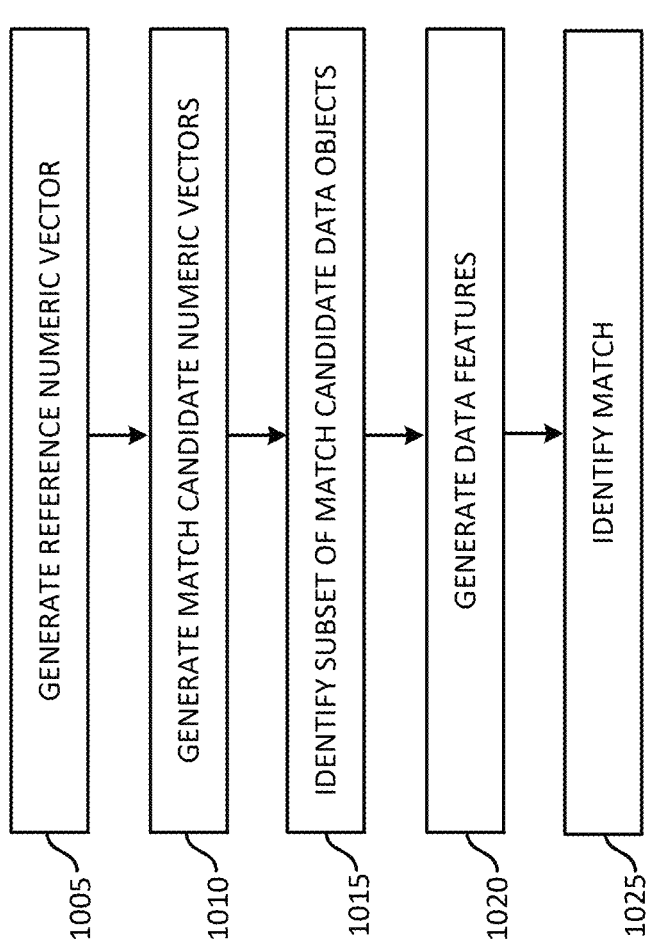

FIG. 10 is a flowchart showing an example process 1000 for intelligently matching data entities across disparate datasets in accordance with some embodiments discussed herein. The flowchart depicts a process 1000 for improving the utilization of data processing resources by intelligently matching potentially dissimilar entity information associated with a single entity from multiple data sources. The process 1000 may be implemented by one or more computing devices, entities, and/or systems described herein. For example, via the various steps/operations of the process 1000, the computing system 100 may leverage improved entity matching techniques (e.g., search space optimization, feature engineering, etc.) to identify matching data records across multiple data sources despite discrepancies between the data records. By doing so, the process 1000 may improve upon traditional data integration techniques by efficiently identifying and accounting for duplicate data records separately recorded across complex computing ecosystems.

FIG. 10 illustrates an example process 1000 for explanatory purposes. Although the example process 1000 depicts a particular sequence of steps/operations, the sequence may be altered without departing from the scope of the present disclosure. For example, some of the steps/operations depicted may be performed in parallel or in a different sequence that does not materially impact the function of the process 1000. In other examples, different components of an example device or system that implements the process 1000 may perform functions at substantially the same time or in a specific sequence.

In some embodiments, the process 1000 includes, at step/operation 1005, generating a reference numeric vector. For example, the computing system 100 may generate the reference numeric vector for a reference data object based on a text representation associated with the reference data object. In some examples, the computing system 100 may generate the text representation based on the one or more reference object attributes. The reference data object may be from a first data source.

In some embodiments, the process 1000 includes, at step/operation 1010, generating a plurality of match candidate numeric vectors. For example, the computing system 100 may generate the plurality of match candidate numeric vectors for a plurality of match candidate data objects. The plurality of match candidate data objects may be from a second data source different from a first data source. In some examples, the computing system 100 may generate the plurality of match candidate numeric vectors based on a plurality of text representations associated with the plurality of match candidate data objects.

In some embodiments, the process 1000 includes, at step/operation 1015, identifying a subset of match candidate data objects. For example, the computing system 100 may identify the subset of match candidate numeric vectors from the plurality of match candidate data objects based on a comparison between the reference numeric vector and the plurality of match candidate numeric vectors. In some examples, the computing system 100 generated the plurality of similarity scores for a plurality of vector attribute pairs. The computing system 100 may select a match candidate numeric vector as part of the subset of match candidate numeric vectors based on a similarity score for the match candidate numeric vector and the reference numeric vector. In some examples, the computing system 100 may compare the vector attribute pairs iteratively, where a single reference numeric vector is compared to a plurality of match candidate numeric vectors.

In some embodiments, the computing system 100 generates a vector similarity score between the reference numeric vector and a respective match candidate numeric vector of the plurality of match candidate numeric vectors. The computing system 100 may identify the subset of match candidate data objects from the plurality of match candidate data objects based on the vector similarity score.

In some embodiments, the computing system 100 selects the subset of match candidate data objects from the plurality of match candidate data objects based on a comparison between the vector similarity score and a threshold similarity score. In some embodiments, the computing system 100 selects the subset of match candidate data objects from the plurality of match candidate data objects based on the vector similarity score, a plurality of vector similarity scores corresponding to the plurality of match candidate data objects, and/or a threshold number of candidate data objects.

In some embodiments, the process 1000 includes, at step/operation 1020, generating a plurality of data features. For example, the computing system 100 may generate the plurality of data features based on a comparison between one or more reference object attributes corresponding to the reference data object and one or more matching object attributes corresponding to the subset of match candidate data objects. In some examples, the computing system 100 may generate the plurality of data features for the subset of match candidate data objects. By generating the plurality of data features for the subset of match candidate data objects as opposed to the plurality of match candidate data objects, processing resources may be conserved.

In some embodiments, the computing system 100 may generate a plurality of data features based on a comparison between one or more reference object attributes corresponding to the reference data object and one or more matching object attributes corresponding to the subset of match candidate data objects. By generating the plurality of data features for the subset of match candidate data objects as opposed to the plurality of match candidate data objects, processing resources may be conserved.

In some embodiments, the plurality of data features includes a string matching feature corresponding to a text attribute pair. The text attribute pair may include a reference object attribute of the one or more reference object attributes and a matching object attribute of the one or more matching object attributes. The reference object attribute may be a first text string corresponding to the reference data object and the matching object attribute may be a second text string corresponding to a match candidate data object. In some embodiments, the string matching feature includes a Levenshtein ratio between the first text string and the second text string.

In some embodiments, the plurality of data features includes a geographic distance feature corresponding to a region attribute pair. In some examples, the region attribute pair may include a reference object attribute of the one or more reference object attributes and a matching object attribute of the one or more matching object attributes. The reference object attribute may be a first region identifier corresponding to the reference data object and the matching object attribute may be a second region identifier corresponding to a match candidate data object of the subset of match candidate data objects. In some embodiments, the geographic distance feature identifies a geographic distance between the reference data object and the match candidate data object. In some embodiments, the geographic distance feature includes a Haversine distance between the first region identifier and the second region identifier.

In some embodiments, the plurality of data features includes an indicator feature corresponding to an indicator attribute pair. In some examples, the indicator attribute pair may include a reference object attribute of the one or more reference object attributes and matching object attribute of the one or more matching object attributes. The reference object attribute may be a first indicator attribute of the one or more reference object attributes and the matching object attribute may be a second indicator attribute of the one or more match candidate data objects.

In some embodiments, the plurality of data features includes a vector similarity score corresponding to a vector attribute pair, where the vector attribute pair includes the reference numeric vector corresponding to the reference data object, and a respective candidate numeric vector of the plurality of match candidate numeric vectors that corresponds to a match candidate data object of the subset of match candidate data objects.

In some embodiments, the process 1000 includes, at step/operation 1025, identifying a match. For example, the computing system 100 may identify a matching between the reference data object and a match candidate data object of the subset of match candidate data objects. In some examples, the computing system 100 may identify the match using an entity matching model. Additionally, or alternatively, the computing system 100 may identify the match based on the plurality of data features. In some embodiments, the reference data object is associated with a ground truth data object. The computing system 100 may modify one or more parameters of the entity matching model based on a comparison between the ground truth data object and the match candidate data object.

Some techniques of the present disclosure enable the generation of action outputs that may be performed to initiate one or more real world actions to achieve real-world effects. The entity matching techniques of the present disclosure may be used, applied, and/or otherwise leveraged to identify instances of data associated with a single individual, which may improve systems that depend on the identification of data across multiple data sources, such as health insurance systems. The determination that two or more data instances are associated with a same individual may trigger the performance of various computing tasks that improve the performance of a computing system (e.g., a computer itself, etc.) with respect to various actions performed by the computing system. Example actions may include the display, transmission, and/or the like of data reflective of data match identification, such as alerts associated with a coordination of benefits outcome for a member, and/or the like. Moreover, the actions may include physical actions, such as an allocation of insurance coverage, mailing of a physical letter, and/or the like, that may be triggered in response to the identification of multiple data instances associated with a same individual.

In some examples, the computing tasks may include actions that may be based on a network domain. A network domain may include any environment in which computing systems may be applied to communicate messages and initiate the performance of computing tasks responsive to the messages. These actions may cause real-world changes, for example, by controlling a hardware component, providing alerts, interactive actions, and/or the like. For instance, actions may include the initiation of automated instructions across and between devices, automated notifications, automated scheduling operations, automated precautionary actions, automated security actions, automated data processing actions, and/or the like.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Some embodiments of the present disclosure may be implemented by one or more computing devices, entities, and/or systems described herein to perform one or more example operations, such as those outlined below. For example, via the various steps/operations of the below examples, a computing system may leverage improved data entity matching techniques to improve the utilization of data processing resources by intelligently matching potentially dissimilar entity information associated with a single entity from multiple data sources. The examples are provided for explanatory purposes. Although the examples outline a particular sequence of steps/operations, each sequence may be altered without departing from the scope of the present disclosure. For example, some of the steps/operations depicted may be performed in parallel or in a different sequence that does not materially impact the function of the various examples. In other examples, different components of an example device or system that implements a particular example may perform functions at substantially the same time or in a specific sequence.

Example 1. A computer-implemented method comprising generating, by one or more processors, a reference numeric vector for a reference data object from a first data source based on a text representation associated with the reference data object; generating, by the one or more processors, a plurality of match candidate numeric vectors for a plurality of match candidate data objects from a second data source based on a plurality of text representations associated with the plurality of match candidate data objects; identifying, by the one or more processors, a subset of match candidate data objects from the plurality of match candidate data objects based on a comparison between the reference numeric vector and the plurality of match candidate numeric vectors; generating, by the one or more processors, a plurality of data features based on a comparison between (a) one or more reference object attributes corresponding to the reference data object and (b) one or more matching object attributes corresponding to the subset of match candidate data objects; and identifying, by the one or more processors and a using an entity matching model, a match between the reference data object and a match candidate data object of the subset of match candidate data objects based on the plurality of data features.

Example 2. The computer-implemented method of example 1, wherein the plurality of data features comprises a string matching feature corresponding to a text attribute pair, wherein the text attribute pair comprises: (i) a reference object attribute of the one or more reference object attributes that comprises a first text string corresponding to the reference data object, and (ii) a matching object attribute of the one or more matching object attributes that comprises a second text string corresponding to a match candidate data object of the subset of match candidate data objects.

Example 3. The computer-implemented method of example 2, wherein the string matching feature comprises a Levenshtein ratio between the first text string and the second text string.

Example 4. The computer-implemented method of example 1, wherein the plurality of data features comprises a geographic distance feature corresponding to a region attribute pair, wherein the region attribute pair comprises: (i) a reference object attribute of the one or more reference object attributes that comprises a first region identifier corresponding to the reference data object, and (ii) a matching object attribute of the one or more matching object attributes that comprises a second region identifier corresponding to a match candidate data object of the subset of match candidate data objects.

Example 5. The computer-implemented method of example 4, wherein the geographic distance feature identifies a geographic distance between the reference data object and the match candidate data object.

Example 6. The computer-implemented method of example 4, wherein the geographic distance feature comprises a Haversine distance between the first region identifier and the second region identifier.

Example 7. The computer-implemented method of example 1, wherein the plurality of data features comprises a vector similarity score corresponding to a vector attribute pair, wherein the vector attribute pair comprises: (i) the reference numeric vector corresponding to the reference data object, and (ii) a respective candidate numeric vector of the plurality of match candidate numeric vectors that corresponds to a match candidate data object of the subset of match candidate data objects.

Example 8. The computer-implemented method of example 1, wherein the reference data object is associated with a ground truth data object and the method further comprises: modifying one or more parameters of the entity matching model based on a comparison between the ground truth data object and the match candidate data object.

Example 9. The computer-implemented method of example 1, wherein identifying the subset of match candidate data objects from the plurality of match candidate data objects comprises: generating a vector similarity score between the reference numeric vector and a respective match candidate numeric vector of the plurality of match candidate numeric vectors; and identifying the subset of match candidate data objects from the plurality of match candidate data objects based on the vector similarity score.

Example 10. The computer-implemented method of example 9, wherein identifying the subset of match candidate data objects from the plurality of match candidate data objects comprises: selecting the subset of match candidate data objects from the plurality of match candidate data objects based on a comparison between the vector similarity score and a threshold similarity score.

Example 11. The computer-implemented method of example 9, wherein identifying the subset of match candidate data objects from the plurality of match candidate data objects comprises: selecting the subset of match candidate data objects from the plurality of match candidate data objects based on the vector similarity score, a plurality of vector similarity scores corresponding to the plurality of match candidate data objects, and a threshold number of candidate data objects.

Example 12. A computing system comprising memory and one or more processors communicatively coupled to the memory, the one or more processors configured to: generate, by one or more processors, a reference numeric vector for a reference data object from a first data source based on a text representation associated with the reference data object; generate, by the one or more processors, a plurality of match candidate numeric vectors for a plurality of match candidate data objects from a second data source based on a plurality of text representations associated with the plurality of match candidate data objects; identify, by the one or more processors, a subset of match candidate data objects from the plurality of match candidate data objects based on a comparison between the reference numeric vector and the plurality of match candidate numeric vectors; generate, by the one or more processors, a plurality of data features based on a comparison between (a) one or more reference object attributes corresponding to the reference data object and (b) one or more matching object attributes corresponding to the subset of match candidate data objects; and identify, by the one or more processors and a using an entity matching model, a match between the reference data object and a match candidate data object of the subset of match candidate data objects based on the plurality of data features.

Example 13. The computing system of example 12, wherein the plurality of data features comprises a string matching feature corresponding to a text attribute pair, wherein the text attribute pair comprises: (i) a reference object attribute of the one or more reference object attributes that comprises a first text string corresponding to the reference data object, and (ii) a matching object attribute of the one or more matching object attributes that comprises a second text string corresponding to a match candidate data object of the subset of match candidate data objects.

Example 14. The computing system of example 13, wherein the string matching feature comprises a Levenshtein ratio between the first text string and the second text string.

Example 15. The computing system of example 12, wherein the plurality of data features comprises a geographic distance feature corresponding to a region attribute pair, wherein the region attribute pair comprises: (i) a reference object attribute of the one or more reference object attributes that comprises a first region identifier corresponding to the reference data object, and (ii) a matching object attribute of the one or more matching object attributes that comprises a second region identifier corresponding to a match candidate data object of the subset of match candidate data objects.

Example 16. The computing system of example 15, wherein the geographic distance feature identifies a geographic distance between the reference data object and the match candidate data object.

Example 17. The computing system of example 15, wherein the geographic distance feature comprises a Haversine distance between the first region identifier and the second region identifier.

Example 18. The computing system of example 12, wherein the plurality of data features comprises a vector similarity score corresponding to a vector attribute pair, wherein the vector attribute pair comprises: (i) the reference numeric vector corresponding to the reference data object, and (ii) a respective candidate numeric vector of the plurality of match candidate numeric vectors that corresponds to a match candidate data object of the subset of match candidate data objects.

Example 19. The computing system of example 12, wherein the reference data object is associated with a ground truth data object and the one or more processors are further configured to: modify one or more parameters of the entity matching model based on a comparison between the ground truth data object and the match candidate data object.

Example 20. One or more non-transitory computer-readable storage media including instructions that, when executed by one or more processors, cause the one or more processors to: generate, by one or more processors, a reference numeric vector for a reference data object from a first data source based on a text representation associated with the reference data object; generate, by the one or more processors, a plurality of match candidate numeric vectors for a plurality of match candidate data objects from a second data source based on a plurality of text representations associated with the plurality of match candidate data objects; identify, by the one or more processors, a subset of match candidate data objects from the plurality of match candidate data objects based on a comparison between the reference numeric vector and the plurality of match candidate numeric vectors; generate, by the one or more processors, a plurality of data features based on a comparison between (a) one or more reference object attributes corresponding to the reference data object and (b) one or more matching object attributes corresponding to the subset of match candidate data objects; and identify, by the one or more processors and a using an entity matching model, a match between the reference data object and a match candidate data object of the subset of match candidate data objects based on the plurality of data features.

The invention claimed is:

1. A computer-implemented method comprising:
   receiving, by one or more processors, from a first data source, a reference data object comprising a plurality of data elements;
   generating, by the one or more processors, a text representation for the reference data object according to a predefined sequence, wherein the text representation comprises a string value comprising at least two data elements, of the plurality of data elements, positioned in accordance with the predefined sequence;

generating, by the one or more processors, a reference numeric vector for the reference data object based on the text representation;
   generating, by the one or more processors, a plurality of match candidate numeric vectors for a plurality of match candidate data objects from a second data source based on a plurality of text representations associated with the plurality of match candidate data objects;
   identifying, by the one or more processors, a subset of match candidate data objects from the plurality of match candidate data objects based on a comparison between the reference numeric vector and the plurality of match candidate numeric vectors;
   generating, by the one or more processors, a plurality of data features based on a comparison between (a) a plurality of reference object attributes corresponding to the reference data object and (b) a plurality of matching object attributes corresponding to the subset of match candidate data objects;
   providing, by the one or more processors, the plurality of data features to an entity matching machine learning model to generate a plurality of match scores, wherein a match score of the plurality of match scores comprises a probabilistic value of a match likelihood between one of the subset of match candidate data objects and the reference data object; and
   identifying, by the one or more processors, a match between the reference data object and a match candidate data object of the subset of match candidate data objects based on the plurality of match scores and a threshold.

2. The computer-implemented method of claim 1, wherein the plurality of data features comprises a string matching feature corresponding to a text attribute pair, wherein the text attribute pair comprises:
   (i) a reference object attribute of the plurality of reference object attributes that comprises a first text string corresponding to the reference data object, and
   (ii) a matching object attribute of the plurality of matching object attributes that comprises a second text string corresponding to the match candidate data object of the subset of match candidate data objects.

3. The computer-implemented method of claim 2, wherein the string matching feature comprises a Levenshtein ratio between the first text string and the second text string.

4. The computer-implemented method of claim 1, wherein the plurality of data features comprises a geographic distance feature corresponding to a region attribute pair, wherein the region attribute pair comprises:
   (i) a reference object attribute of the plurality of reference object attributes that comprises a first region identifier corresponding to the reference data object, and
   (ii) a matching object attribute of the plurality of matching object attributes that comprises a second region identifier corresponding to the match candidate data object of the subset of match candidate data objects.

5. The computer-implemented method of claim 4, wherein the geographic distance feature identifies a geographic distance between the reference data object and the match candidate data object.

6. The computer-implemented method of claim 4, wherein the geographic distance feature comprises a Haversine distance between the first region identifier and the second region identifier.

7. The computer-implemented method of claim 1, wherein the plurality of data features comprises a vector similarity score corresponding to a vector attribute pair, wherein the vector attribute pair comprises:

(i) the reference numeric vector corresponding to the reference data object, and (ii) a respective candidate numeric vector of the plurality of match candidate numeric vectors that corresponds to the match candidate data object of the subset of match candidate data objects.

8. The computer-implemented method of claim 1, wherein the reference data object is associated with a ground truth data object and the computer-implemented method further comprises:

modifying a parameter of the entity matching machine learning model based on a comparison between the ground truth data object and the match candidate data object.

9. The computer-implemented method of claim 1, wherein identifying the subset of match candidate data objects from the plurality of match candidate data objects comprises:

generating a vector similarity score between the reference numeric vector and a respective match candidate numeric vector of the plurality of match candidate numeric vectors; and identifying the subset of match candidate data objects from the plurality of match candidate data objects based on the vector similarity score.

10. The computer-implemented method of claim 9, wherein identifying the subset of match candidate data objects from the plurality of match candidate data objects comprises:

selecting the subset of match candidate data objects from the plurality of match candidate data objects based on a comparison between the vector similarity score and a threshold similarity score.

11. The computer-implemented method of claim 9, wherein identifying the subset of match candidate data objects from the plurality of match candidate data objects comprises:

selecting the subset of match candidate data objects from the plurality of match candidate data objects based on the vector similarity score, a plurality of vector similarity scores corresponding to the plurality of match candidate data objects, and a threshold number of candidate data objects.

12. A computing system comprising memory and one or more processors communicatively coupled to the memory, the one or more processors configured to:

receive from a first data source, a reference data object comprising a plurality of data elements;

generate a text representation for the reference data object according to a predefined sequence, wherein the text representation comprises a string value comprising at least two data elements, of the plurality of data elements, positioned in accordance with the predefined sequence;

generate a reference numeric vector for a reference data object from a first data source based on a text representation associated with the reference data object;

generate a plurality of match candidate numeric vectors for a plurality of match candidate data objects from a second data source based on a plurality of text representations associated with the plurality of match candidate data objects;

identify a subset of match candidate data objects from the plurality of match candidate data objects based on a comparison between the reference numeric vector and the plurality of match candidate numeric vectors;

generate a plurality of data features based on a comparison between (a) a plurality of reference object attributes corresponding to the reference data object and (b) a plurality of matching object attributes corresponding to the subset of match candidate data objects;

provide the plurality of data features to an entity matching machine learning model to generate a plurality of match scores, wherein a match score of the plurality of match scores comprises a probabilistic value of a match likelihood between one of the subset of match candidate data objects and the reference data object; and identify a match between the reference data object and a match candidate data object of the subset of match candidate data objects based on the plurality of match scores and a threshold.

13. The computing system of claim 12, wherein the plurality of data features comprises a string matching feature corresponding to a text attribute pair, wherein the text attribute pair comprises:

(i) a reference object attribute of the plurality of reference object attributes that comprises a first text string corresponding to the reference data object, and (ii) a matching object attribute of the plurality of matching object attributes that comprises a second text string corresponding to the match candidate data object of the subset of match candidate data objects.

14. The computing system of claim 13, wherein the string matching feature comprises a Levenshtein ratio between the first text string and the second text string.

15. The computing system of claim 12, wherein the plurality of data features comprises a geographic distance feature corresponding to a region attribute pair, wherein the region attribute pair comprises:

(i) a reference object attribute of the plurality of reference object attributes that comprises a first region identifier corresponding to the reference data object, and (ii) a matching object attribute of the plurality of matching object attributes that comprises a second region identifier corresponding to the match candidate data object of the subset of match candidate data objects.

16. The computing system of claim 15, wherein the geographic distance feature identifies a geographic distance between the reference data object and the match candidate data object.

17. The computing system of claim 15, wherein the geographic distance feature comprises a Haversine distance between the first region identifier and the second region identifier.

18. The computing system of claim 12, wherein the plurality of data features comprises a vector similarity score corresponding to a vector attribute pair, wherein the vector attribute pair comprises:

(i) the reference numeric vector corresponding to the reference data object, and (ii) a respective candidate numeric vector of the plurality of match candidate numeric vectors that corresponds to the match candidate data object of the subset of match candidate data objects.

19. The computing system of claim 12, wherein the reference data object is associated with a ground truth data object and the one or more processors are further configured to:

modify a parameter of the entity matching machine learning model based on a comparison between the ground truth data object and the match candidate data object.

20. One or more non-transitory computer-readable storage media including instructions that, when executed by one or more processors, cause the one or more processors to:

receive from a first data source, a reference data object comprising a plurality of data elements;

generate a text representation for the reference data object according to a predefined sequence, wherein the text representation comprises a string value comprising at least two data elements, of the plurality of data elements, positioned in accordance with the predefined sequence;

generate a reference numeric vector for a reference data object from a first data source based on a text representation associated with the reference data object;

generate a plurality of match candidate numeric vectors for a plurality of match candidate data objects from a second data source based on a plurality of text representations associated with the plurality of match candidate data objects;

identify a subset of match candidate data objects from the plurality of match candidate data objects based on a comparison between the reference numeric vector and the plurality of match candidate numeric vectors;

generate a plurality of data features based on a comparison between (a) a plurality of reference object attributes corresponding to the reference data object and (b) a plurality of matching object attributes corresponding to the subset of match candidate data objects;

provide the plurality of data features to an entity matching machine learning model to generate a plurality of match scores, wherein a match score of the plurality of match scores comprises a probabilistic value of a match likelihood between one of the subset of match candidate data objects and the reference data object; and identify a match between the reference data object and a match candidate data object of the subset of match candidate data objects based on the plurality of data features.

* * * * *